(12) United States Patent
Dekeyser et al.

(10) Patent No.: US 12,499,309 B1
(45) Date of Patent: Dec. 16, 2025

(54) PROGRAMMATICALLY UPDATING MACHINE LEARNING MODELS

(71) Applicant: Amazon Technologies, Inc., Seattle, WA (US)

(72) Inventors: Elizabeth Dekeyser, Arlington, MA (US); Nicholas Comment, Cambridge, MA (US); Shermin Pei, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 17/740,871

(22) Filed: May 10, 2022

(51) Int. Cl.
*G06F 40/279* (2020.01)
*G06F 18/21* (2023.01)
*G06F 18/214* (2023.01)
*G06N 20/20* (2019.01)

(52) U.S. Cl.
CPC .......... *G06F 40/279* (2020.01); *G06F 18/214* (2023.01); *G06F 18/217* (2023.01); *G06N 20/20* (2019.01)

(58) Field of Classification Search
CPC .................................................. G06F 40/279
See application file for complete search history.

(56) References Cited

U.S. PATENT DOCUMENTS

| | | | | |
|---|---|---|---|---|
| 11,955,134 B2* | 4/2024 | Amid | ................... | G10L 21/0332 |
| 12,242,820 B2* | 3/2025 | Salaam | ................... | G06F 40/58 |
| 2010/0049590 A1* | 2/2010 | Anshul | ................... | G06Q 30/02 |
| | | | | 706/54 |
| 2020/0302234 A1* | 9/2020 | Walters | ................ | G06F 16/9035 |
| 2021/0224486 A1* | 7/2021 | Stabler | ................ | G06F 18/2148 |
| 2021/0406369 A1* | 12/2021 | Healy | .................... | G06F 21/562 |
| 2021/0406533 A1* | 12/2021 | Arroyo | ................. | G06F 40/177 |
| 2022/0108222 A1* | 4/2022 | Brannon | ................ | G06N 20/00 |
| 2023/0169394 A1* | 6/2023 | Niu | .......................... | G06N 5/01 |
| | | | | 706/12 |
| 2023/0237384 A1* | 7/2023 | Dowdell | .................. | G06N 5/01 |
| | | | | 706/12 |

OTHER PUBLICATIONS

Amittai Axelrod et al., "Domain Adaptation via Pseudo In-Domain Data Selection." In Proceedings of the 2011 Conference on Empirical Methods in Natural Language Processing, (ACL), 2011, pp. 355-362.

(Continued)

*Primary Examiner* — Bryan S Blankenagel
(74) *Attorney, Agent, or Firm* — Pierce Atwood LLP

(57) ABSTRACT

The present disclosure provide techniques for automated machine learning (ML) training based on updating training data based on model performance. A system can determine a sample pattern from input data to be used for training a model. The system determines a training dataset and a test dataset including multiple samples corresponding to the sample pattern. After training a model using the training dataset, the system tests the model using the test dataset. The system determines that the trained model's performance with respect to a sample pattern is unsatisfactory, and retrains the model using an updated training dataset that includes additional samples corresponding to the sample pattern.

16 Claims, 11 Drawing Sheets

(56) References Cited

OTHER PUBLICATIONS

Mikhail Belkin et al., "Reconciling Modern Machine-Learning Practice and the Classical Bias-Variance Trade-Off." Proceedings of the National Academy of Sciences, vol. 116, No. 32, https://www.pnas.org/doi/epdf/10.1073/pnas.1903070116, 2019, pp. 15849-15854.

David A. Cohn et al., "Active Learning with Statistical Models." Journal of Artificial Intelligence Research 4, 1996, pp. 129-145. AI Foundation and Morgan Kaufmann Publishers.

Cody Coleman et al., "Selection Via Proxy: Efficient Data Selection for Deep Learning." Published as a Conference Paper at ICLR 2020. arXiv preprint arXiv:1906.11829v4, 2020, 25 pages.

Matthias Feurer et al., "Auto-Sklearn 2.0: Hands-free AutoML via Meta-Learning." arXiv preprint arXiv:2007.04074v2, 2021, 56 pages.

Chelsea Finn et al., "Model-Agnostic Meta-Learning for Fast Adaptation of Deep Networks." In 34th International Conference on Machine Learning, PMLR 70. arXiv preprint arXiv:1703.034003v3, 2017, 13 pages.

Yarin Gal et al., "Dropout as a Bayesian Approximation: Representing Model Uncertainty in Deep Learning." In Proceedings of the 33rd International Conference on Machine Learning, (retrieved from https://proceedings.mlr.press/v48/gal16.html), 2016, 10 pages.

Kin He et al., "Automl: A Survey of the State-of-the-Art." arXiv preprint arXiv:1908.00709v6, 2021, 37 pages.

Rishabh K. Iyer et al., "Submodular Optimization with Submodular Cover and Submodular Knapsack Constraints." In Advances in Neural Information Processing Systems, (retrieved from https://papers.nips.cc/paper/2013/file/a1d50185e7426cbb0acad1e6ca74b9aa-Paper.pdf), 2013, 9 pages.

Christoph Kading et al., "Fine-tuning Deep Neural Networks in Continuous Learning Scenarios." In ACCV 2016 Workshop on Interpretation and Visualization of Deep Neural Nets, 2016, pp. 588-605. Springer.

Zhuoming Liu et al., "Influence Selection for Active Learning." In Proceedings of the 2021 IEEE/CVF International Conference on Computer Vision (ICCV), arXiv preprint arXiv:2108.09331, 2021, 18 pages.

Richard C. Moore et al., "Intelligent Selection of Language Model Training Data." In Proceedings of the ACL 2010 conference short papers, 2010, pp. 220-224.

Hung Viet Pham et al., "Problems and Opportunities in Training Deep Learning Software Systems: An Analysis of Variance." In Proceedings of the 35th IEEE/ACM International Conference on Automated Software Engineering, (retrieved from https://hvpham.github.io/publications/), 2020, pp. 771-783.

Jacob M. Schreiber et al., "apricot: Submodular selection for data summarization in Python." In Journal of Machine Learning Research 21, 2020, 6 pages.

Burr Settles, "Active Learning Literature Survey." Computer Sciences Technical Report 1648, University of Wisconsin—Madison, https://research.cs.wisc.edu/techreports/2009/TR1648.pdf, 2009, 46 pages.

Noam Shazeer et al., "Outrageously Large Neural Networks: The Sparsely-Gated Mixture-of-Experts Layer." arXiv preprint arXiv:1701.06538v1, 2017, 19 pages.

Anh Truong et al., "Towards Automated Machine Learning: Evaluation and Comparison of AutoML Approaches and Tools." arXiv preprint arXiv:1908.05557v2, 2019, 9 pages.

Zhiqiang Wan et al., "Variational Autoencoder Based Synthetic Data Generation for Imbalanced Learning." In 2017 IEEE Symposium Series on Computational Intelligence (SSCI), (doi: 10.1109/SSCI.2017.8285168), 2017, pp. 1-7.

Kai Wei et al., "Submodular Subset Selection for Large-Scale Speech Training Data." In 2014 IEEE International Conference on Acoustics, Speech and Signal Processing (ICASSP), (retrieved from https://citeseerx.ist.psu.edu/viewdoc/download?doi=10.1.1.496.6287&rep=rep1&type=pdf), 2014, pp. 3311-3315.

Yue Yu et al., "Fine-Tuning Pre-Trained Language Model with Weak Supervision: A Contrastive-Regularized Self-Training Approach." arXiv preprint arXiv:2010.07835v3, 2021, 15 pages.

Seniha Esen Yuksel et al., "Twenty Years of Mixture of Experts." IEEE Transactions on Neural Networks and Learning Systems, vol. 23, No. 8, 2012, pp. 1177-1193.

Tianyi Zhang et al., "BERTScore: Evaluating Text Generation with BERT." arXiv preprint arXiv:1904.09675v3, 2020, 43 pages.

\* cited by examiner

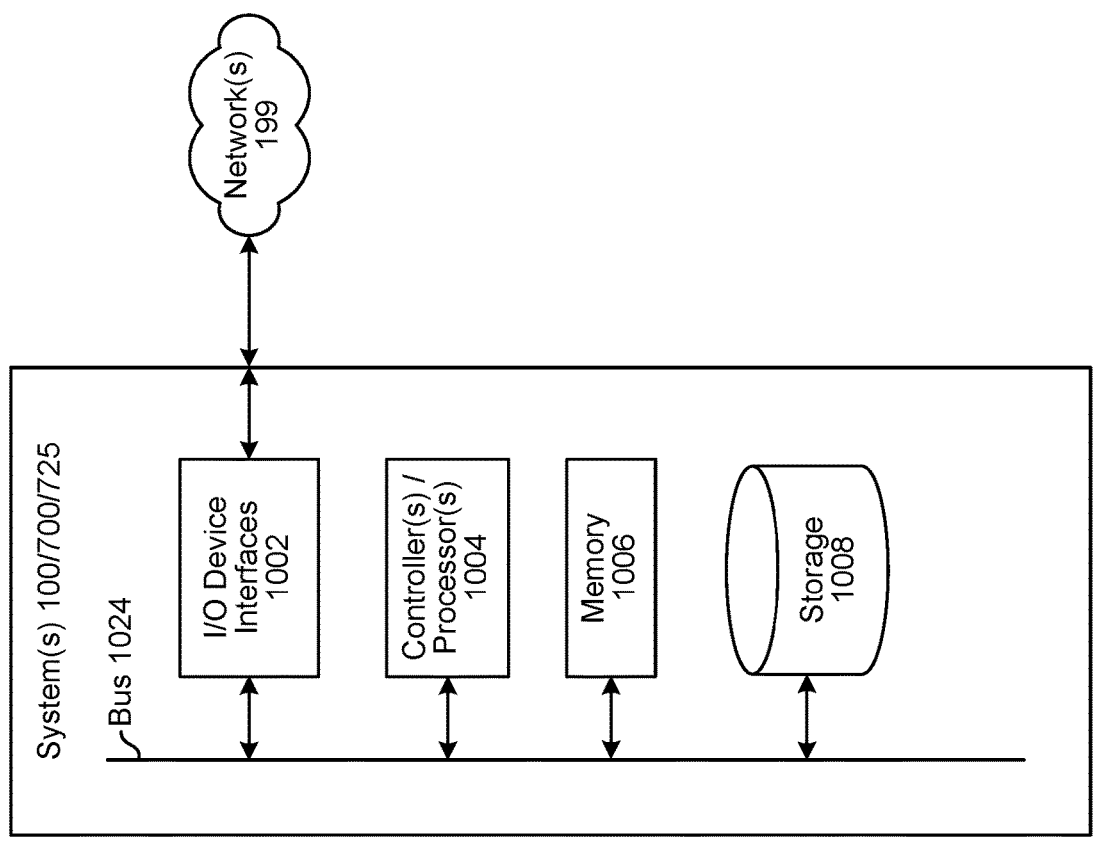

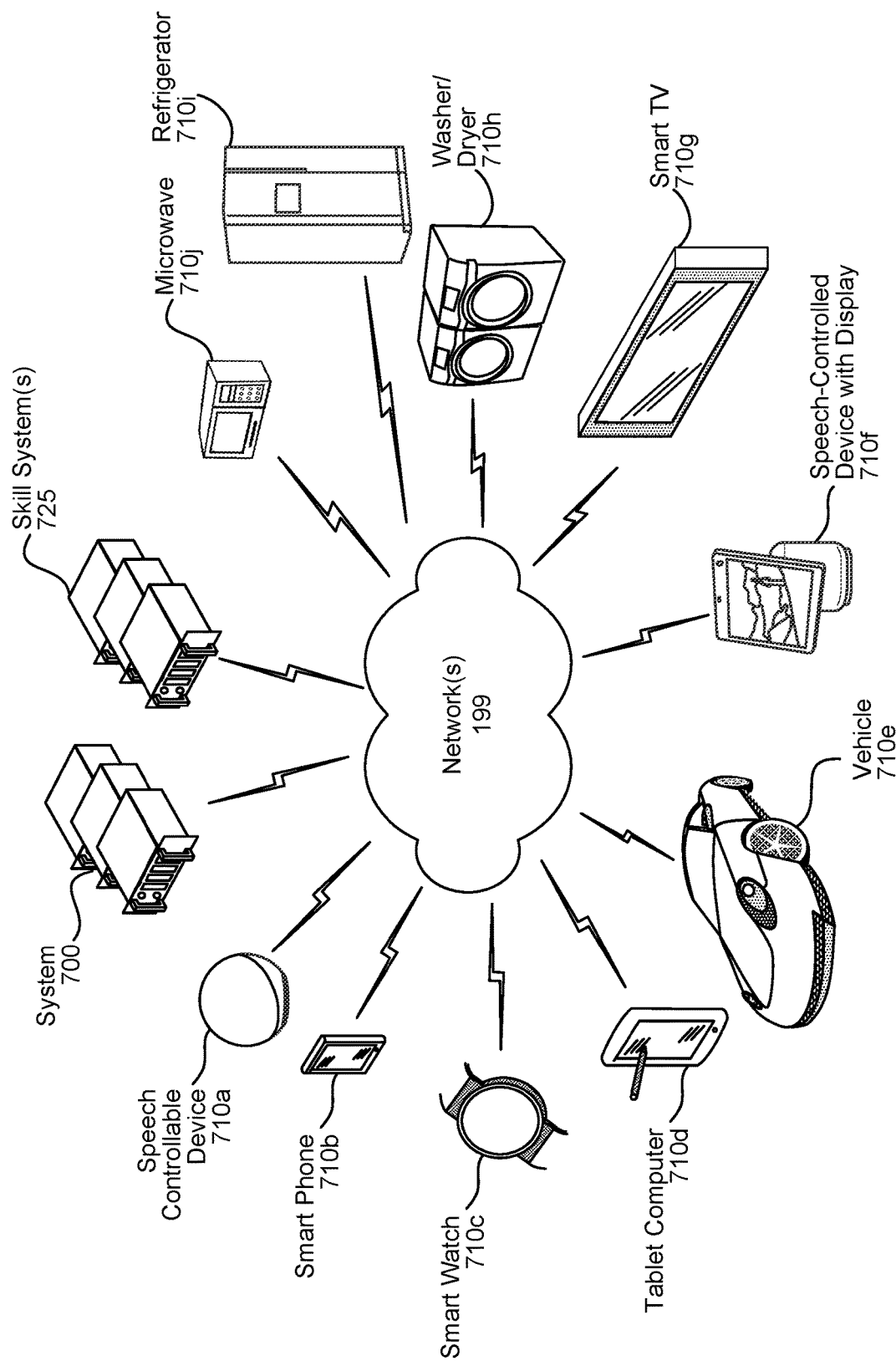

PROGRAMMATICALLY UPDATING MACHINE LEARNING MODELS

BACKGROUND

Machine learning is a computing technique whereby a computing system can learn how to perform a specific task without explicitly being programmed to do so. Machine learning may be used to handle a number of different tasks of varying complexity. Machine learning computing may rely on trained models that are trained using training data sets. Once trained, a machine learning model may be capable of processing input data and producing output data that conforms to the function for which the model has been trained.

BRIEF DESCRIPTION OF DRAWINGS

For a more complete understanding of the present disclosure, reference is now made to the following description taken in conjunction with the accompanying drawings.

FIG. 10 is a block diagram conceptually illustrating example components of a system, according to embodiments of the present disclosure.

FIG. 11 illustrates an example of a computer network for use with the overall system, according to embodiments of the present disclosure.

DETAILED DESCRIPTION

Figure 1:
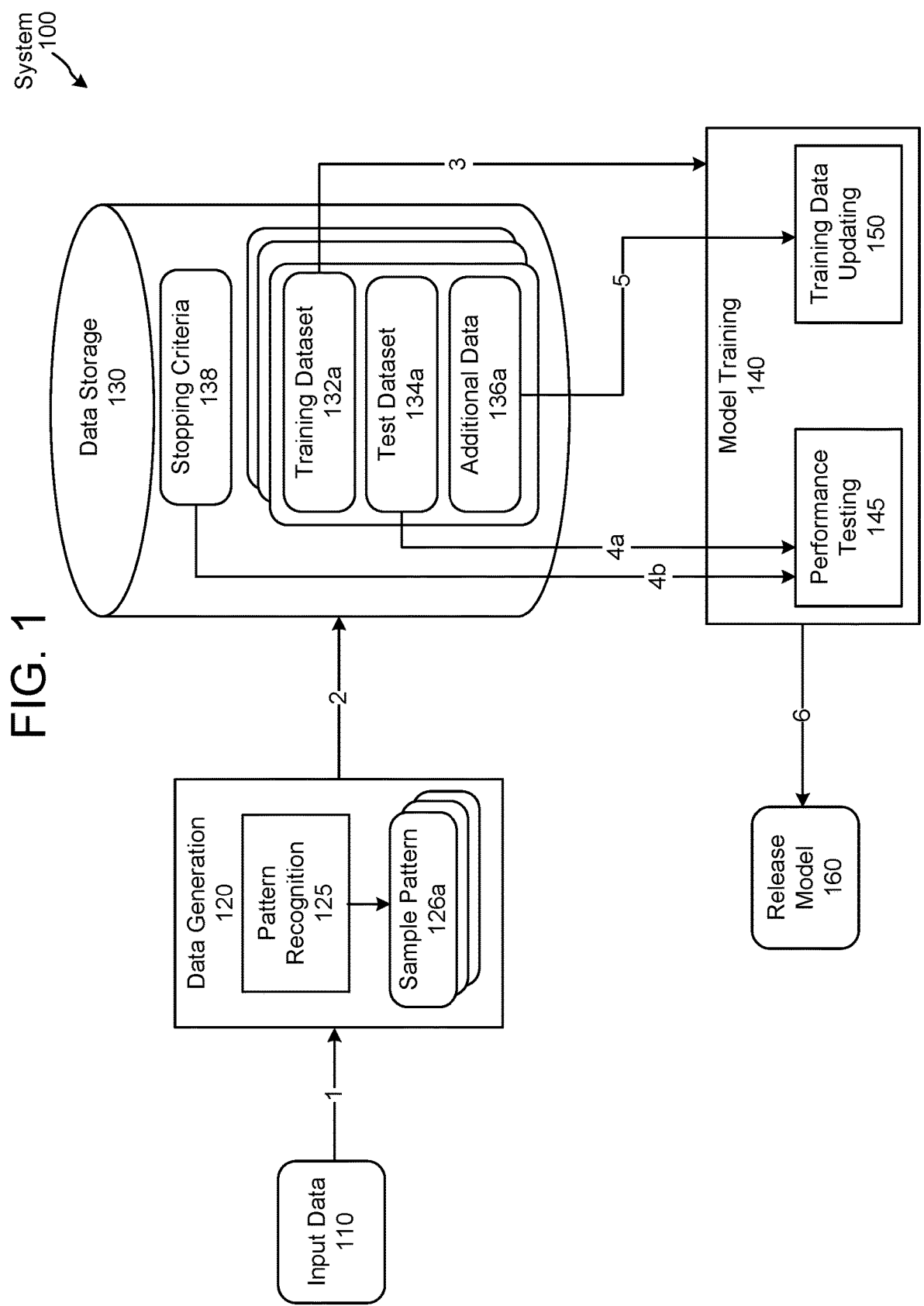
FIG. 1 is a conceptual diagram illustrating an example system for automated machine learning (ML) model training, according to embodiments of the present disclosure.

Machine learning is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus, a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

The present disclosure relates to techniques for automated ML training that involves determining an optimal training dataset for a prediction task. Training of ML models can involve multiple iterations/cycles of processing training data. Sometimes the training data is updated during iterations based on model performance. If the trained model performs the prediction task with an unsatisfactory accuracy, then the training data may be updated to include additional samples. For example, for a classification task where the model is trained to classify an input into a first, second, or other class, and the trained model is able to classify test inputs with a particular accuracy that is below a desired accuracy, then additional input samples corresponding to the first, second, and/or other class may be added to the training data, and the model retrained using the additional training data.

Embodiments of the present disclosure involve determining an optimal number of samples to include in a training dataset based on model performance. Some embodiments involve identifying a pattern in the samples, determining that model performance is unsatisfactory with respect to a particular pattern, and updating the training dataset to include additional samples based on that pattern.

In an example use case, the system may be used to train a domain classification model configured to classify new/additional types of natural language inputs based on intents and entities. For a video domain model, the system may be provided sample natural language inputs, such as "play [first videoname]", "play [second videoname]", "play [first videoname] by [first artist name]", "play [second videoname] by [second artist name]", etc. The system may identify a first pattern of natural language input corresponding to "play [videoname]", and a second pattern of natural language inputs corresponding to "play [videoname] by [artist name]." The system may determine a training dataset including a particular number of sample natural language inputs for each pattern, and train a model using the training dataset. The system may test the trained model using a test dataset, and may determine that the model is unable to classify natural language inputs corresponding to the first pattern with a certain level of accuracy. Based on this determination, the system may determine an updated training dataset, which includes additional sample natural language inputs corresponding to the first pattern, and train the model using the updated training dataset.

In addition to or instead of updating the model parameters and/or model architecture to achieve a desired model performance, the techniques of the present disclosure may involve updating the training data (more specifically the amount of training data) to achieve a desired model performance.

Some embodiments involve the system testing the trained model's performance with respect to samples (which may be referred to as "existing features") that the prediction task was previously configured for. Such testing can ensure that the trained model, now trained to perform the prediction task for "new" (or additional) features, is still able to perform, with a certain level of accuracy, the prediction task with respect to existing features. If the model's performance is unsatisfactory, then the system determines updated training data, which includes additional samples of the existing features, and retrains the model.

Teachings of the present disclosure provide improved automated ML training techniques, which, among other things, improve training efficiency and trained model performance, and result in an improved user experience.

FIG. 1 is a conceptual diagram illustrating example components of a system 100 for automated ML model training. In some embodiments, the system 100 includes a data generation component 120, a data storage 130, and a model training component 140. One or more components of the system 100 may be implemented using components shown in FIG. 10. In some embodiments, the system 100 may be implemented using components of a device, such as those shown in FIG. 9. Although the figures and discussion of the present disclosure illustrate certain steps in a particular order, the steps described may be performed in a different order (as well as certain steps removed or added) without departing from the present disclosure.

The system 100 may process input data 110, which may include multiple input samples to be used to train a ML model for a prediction task. In some implementations, the prediction task may be a classification task. The input samples may correspond to one or more patterns. The pattern may depend on the type of inputs the ML model is to process. For example, patterns in natural language inputs may be based on the words included in the inputs. As another example, patterns in image inputs may be based on the colors included in the images. As yet another example, patterns in audio inputs may be based on the frequencies included in the audio.

The input data 110 may be provided (step 1) to the data generation component 120. In some embodiments, the input data 110 may be inputted or otherwise provided by a user via a computing device, where the user wants to (1) train a new ML model, using the input data 110, for a prediction task or (2) train an existing ML model (already configured for a particular prediction task) to recognize new features/samples represented in the input data 110. Data indicative of the ML model, which is to be trained, may also be provided by the user. Such data may be a storage location where the ML model data is stored and can be accessed for execution and training. The model architecture and other model data (e.g., number of layers, types of layers, certain parameters, number of nodes in the layers, loss/cost function for training, etc.) may be defined or otherwise provided by the user to the system 100.

The data generation component 120 may include a pattern recognition component 125, which may be configured to identify sample patterns 126 in the input data 110. In some embodiments, the input data 110 may identify the patterns of the sample inputs. For example, the input data 110 may include, what is referred to herein as, a carrier phrase, which may identify a verb(s) and a portion where a different noun can be inserted (e.g., a first carrier phrase may be "play [videoname]", a second carrier phrase may be "play [videoname] by [artist name]", etc.). Each carrier phrase may correspond to a different pattern. In such cases, the pattern recognition component 125 may identify the different carrier phrases/patterns represented in the input data 110.

The sample pattern 126 may be data representing a natural language input pattern. For example, sample pattern 126a may be text data (or other language meaning representation data) representing "play [videoname]", sample pattern 126b may be text data representing "play [videoname] by [artist name]", etc.

In some embodiments, the input data 110 may include a catalog of nouns, which may be referred to as entities, to be inserted or otherwise used with the carrier phrases or sample patterns. Continuing with the example of a carrier phrase "play [videoname]", the input data 110 may include a catalog of video names available to be played by the system 200.

In other embodiments, the input data 110 may include a plurality of sample inputs. For example, the input data 110 may include multiple different natural language inputs, such as "play [first videoname]", "play [second videoname]", "resume [first videoname]", "resume [second videoname]", etc. In such cases, the pattern recognition component 125 may identify patterns based on the verb(s) included in the inputs. For example, "play [videoname]" may be identified as a first pattern 126a, and "resume [videoname]" may be identified as a second pattern 126b. The pattern recognition component 125 may employ one or more natural language processing (NLP) techniques (e.g., part-of-speech tagging, grammar rules, etc.) to identify patterns in natural language inputs.

In some embodiments, the pattern recognition component 125 may determine patterns in sample natural language inputs based on exact matching of words. For example, "play [videoname]" may be determined to be a first pattern, while "play the movie [videoname]" may be determined to be a second pattern.

In some embodiments, the pattern recognition component 125 may be configured to identify patterns in sample natural language inputs based on semantic or meaning-based similarities. For example, "play [first videoname]" and "play the movie [first videoname]" may be determined to correspond to the same pattern based on the same semantic meaning of the natural language inputs.

The pattern recognition component 125 may identify a pattern from sample image inputs based on various factors, such as number/percentage of colored pixels versus number/percentage of black and white pixels, number/percentage of background pixels versus number/percentage of foreground pixels, number/percentage of light pixels versus number/percentage of dark pixels, etc.

The pattern recognition component 125 may identify a pattern from sample audio inputs based on various factors, such as low audio frequency, high audio frequency, mean/median frequency, amount of background noise, signal-to-noise ratio, etc.

The data generation component 120 may be configured to generate a corpus of sample inputs and to determine training datasets and test datasets. In some embodiments, the data generation component 120 may be configured to generate the corpus, training datasets and test datasets corresponding to each pattern represented in the input data 110.

In the case where the input data 110 includes an entity catalog, the data generation component 120 may generate the corpus of sample inputs by combining the entities from the entity catalog with the carrier phrase(s) or sample pattern(s) to form a complete natural language input. As such, if the entity catalog includes one hundred video names, then using the carrier phrase or sample pattern "play [videoname]", the data generation component 120 may generate one hundred natural language inputs. For further example, if the entity catalog includes one hundred entities and the pattern recognition component 125 determines the input data 110 includes two carrier phrases, the data generation component 120 may generate two hundred natural language inputs (one hundred for each carrier phrase).

From the corpus of sample inputs, the data generation component 120 may determine training and testing datasets. In example embodiments, the data generation component 120 may use a portion (e.g., eighty percent) of the sample inputs in the corpus as the training dataset, and another portion (e.g., twenty percent) of the sample inputs in the corpus as the testing dataset. In other embodiments, the data generation component 120 may use a particular number (e.g., fifty) of the sample inputs in the corpus as the training dataset, and a particular number of sample inputs as the testing dataset. In some embodiments, the data generation component 120 may ensure that the testing dataset is a particular size (e.g., twenty percent) relative to the training dataset.

After determining the training and testing datasets, there may be unused sample inputs from the corpus, which may be stored as additional data to be used later during training operations as described below.

The data generation component 120 may store (step 2) the determined datasets in the data storage 130. As shown, the data storage 130 may store one or more training datasets 132. A training dataset 132a may correspond to a particular sample pattern 126a. The data storage 130 may store one or more testing datasets 134. Each testing dataset 134 may be associated with a particular training dataset 132 generated from the same corpus of sample inputs. The data storage 130 may also store one or more additional data 136. Each additional data 136 may be associated with a particular training datasets 132 and a particular test datasets 134 generated from the same corpus of sample inputs. The additional data 136 may include sample inputs that are not used as training or testing samples. For example, the training dataset 132a, the test dataset 134a, and the additional data 136a may correspond to the sample pattern 126a.

The data storage 130 may further store stopping criteria data 138 indicative of one or more stopping criterion for training the model. The stopping criteria data 138 may be one or more of a maximum number of training cycles to perform, a maximum amount of computational time to use, a minimum performance metric, and other criterion. One or more of the stopping criterion may be a system configuration, while other may be provided by the user who wants to use the system 100 for automatically training a model.

The model training component 140 may be configured to train a model, to test the model's performance, and to update training data to retrain the model based on the model's performance. The model training component 140 may train the model, provided by the user, using the training dataset(s) 132. The model training component 140 may retrieve/receive (step 3) the training dataset 132 from the data storage 130. In training the model, the model training component 140 may execute one or more training epochs/iterations, in which the model may process the training dataset 132 to learn features and update model parameters according to a loss/cost function (provided by the user). The model training component 140 may perform training epochs/iterations until the model satisfies a threshold condition (e.g., an error condition, a loss, etc.) of the loss/cost function, and/or until the model converges based on the training dataset. In some embodiments, the model training component 140 may perform a certain number of epochs/iterations (e.g., three) and then stop training the model. In some cases, the model training component 140 may ensure that the model is not over-trained or over-fitted to the training dataset 132 by limiting the number of training epochs/iterations performed.

After training the model (referred to herein as the "trained model"), the model training component 140 may test the trained model's performance with respect to the test dataset 134 generated from the same corpus of sample inputs as the training dataset 132 used to train the instant model. A performance testing component 145 may retrieve/receive (step 4a) the test dataset 134 from the data storage 130. In testing the trained model's performance, the performance testing component 145 may process the test dataset 134 using the trained model to generate predictions corresponding to the sample inputs included in the test dataset 134. The performance testing component 145 may compare the trained model generated predictions and labels (e.g., ground truth) associated with the sample inputs to determine one or more model performance metrics. In example embodiments, the performance testing component 145 may determine a prediction accuracy metric for the trained model based on the generated predictions and the ground truth labels. Such prediction accuracy metric may represent how many (which may be represented as a percentage) of the generated predictions are correct (i.e., match the ground truth labels). The performance testing component 145 may also retrieve/receive (step 4b) the stopping criteria data 138 from the data storage 130, where the stopping criteria 138 may indicate a minimum performance metric for the trained model. If the prediction accuracy metric (or other performance metrics) satisfies a threshold condition, such as the minimum performance metric in the stopping criteria data 138 (which may be provided by the user), then the trained model may be outputted or otherwise provided (step 6) as a release model 160, which may be used for runtime operations for performing the prediction task on subsequently received inputs or may be used for further processing as described below. If the prediction accuracy metric (or other performance metrics) does not satisfy the threshold condition/minimum performance metric, then the model training component 140 may determine updated training data to retrain the model.

A training data updating component 150, of the model training component 140, may be configured to determine updated training data for training the model, when the trained model's performance with respect to the test dataset 134 is unsatisfactory. In updating the training data, the training data updating component 150 may add additional sample inputs to the training dataset 132. In some embodiments, the training data updating component 150 may determine that the trained model's performance is unsatisfactory with respect to a particular sample pattern 126a to which the test dataset 134a corresponds, and may add additional samples corresponding to the particular sample pattern to the training dataset 132. In some embodiments, the training data updating component 150 may add a certain number of sample inputs to the training dataset 132 or a certain percentage (e.g., one percent) of sample inputs of the training dataset 132.

The training data updating component 150 may retrieve/receive (step 5) the additional data 136 from the data storage 130, from which the training data updating component 150 may add additional sample inputs to the training dataset 132. The updated training dataset may be stored separately in the data storage 130 or may replace the training dataset 132.

The model training component 140 may then use the updated training dataset, determined by the training data updating component 150, to train the model for one or more training epochs/iterations. In some embodiments, the model training component 140 may perform training epochs/iterations using the updated training dataset on the model that is provided by the user. In other embodiments, the model training component 140 may perform training epochs/iterations using the updated training dataset on the trained model that was trained using the initial training dataset 132. After training the model using the updated training dataset, the performance testing component 145 may test the (updated/second) trained model's performance with respect to the test dataset 134. If the prediction accuracy metric (or other performance metrics) of the (updated/second) trained model satisfies the threshold condition, then the (updated/second) trained model may be outputted or otherwise provided (step 6) as the release model 160. If the prediction accuracy metric (or other performance metrics) does not satisfy the threshold condition, then the model training component 140 may further update the training data to retrain the model.

Along with the release model 160, the model training component 140 may also output/provide metadata corresponding to the release model 160. Such metadata may include information on which stopping criteria was triggered, number of training cycles performed, amount of computation time used, final training dataset used for the release model, overall model performance metrics, model performance metrics with respect to individual sample patterns 126, and other information.

In this manner, the system 100 performs automated ML model training, where the training data used to train the model is updated based on the model's performance. Some automated ML model training systems may involve updating the model parameters and/or model architecture to achieve a desired model performance. Some embodiments may, instead or in additionally, involve updating the training data (more specifically the number of samples in the training data) to achieve a desired model performance.

Figure 2:
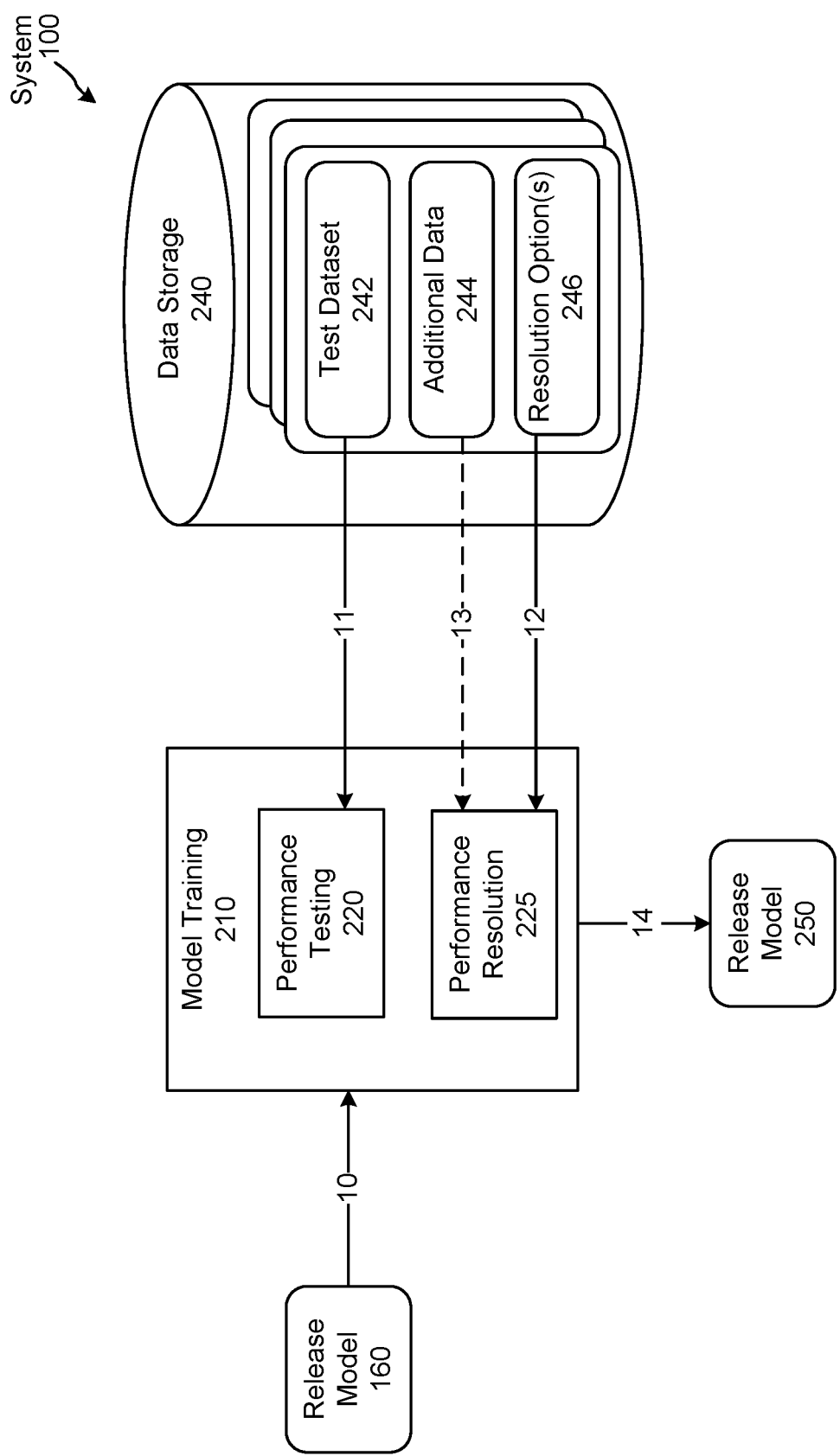
FIG. 2 is a conceptual diagram illustrating another example system for automated ML model training, according to embodiments of the present disclosure.

FIG. 2 illustrates additional example components of the system 100 for automated ML model training, according to embodiments of the present disclosure. The system 100 may be configured to test performance of the release model 160 with respect to a test dataset 242. The release model 160 may be trained to perform the prediction task with respect to new/additional sample inputs (also referred to as new features) included in the input data 110. The release model 160, in some cases, may be based on an existing model that was previously trained (and may have even been used in runtime operations) using certain previous sample inputs (also referred to as existing features) to perform the prediction task. The test dataset 242 may include a subset of the previous sample inputs (the existing features) or may include sample inputs based on the previous sample inputs.

For example, the system 100 may be used to train an existing domain classification model to be able to recognize (i.e., make predictions for) certain new natural language inputs (e.g., "play [videoname]", "resume [videoname]", etc.). As described above in relation to FIG. 1, the system 100 may train the domain classification model using the input data 110, where the input data 110 may include new sample natural language inputs that the model is to recognize. After determining the release model 160 (i.e., the domain classification model in this example), the system 100 may test the release model's performance with respect to natural language inputs (e.g., "stop", "forward", "rewind" etc.) that the domain classification model was already trained to recognize, and that may be included in the test dataset 242.

The system 100 may include a model training component 210 and a data storage 240 for the foregoing purpose. In other embodiments, the model training component 140 may be configured to perform one or more of the functionalities described in relation to the model training component 210. In other embodiments, the data storage 130 may store one or more of the data described in relation to the data storage 240.

The test dataset 242 may be provided by the user, and may be stored in the data storage 240. The data storage 240 may store additional data 244 including one or more additional sample inputs corresponding to the test dataset 242. The additional data 244 may be associated with the test dataset 242. In some embodiments, the additional data 244 may be provided by the user. In other embodiments, the additional data 244 may be generated by the system 100 in a similar manner as described in relation to the data generation component 120. For example, the system 100 may identify one or more sample patterns represented in the test dataset 242, may generate additional sample inputs corresponding to the sample pattern(s), and may store the additional sample inputs as the additional data 244.

The data storage 240 may also include resolution option(s) 246 associated with the test dataset 242. The resolution option(s) 246 may represent one or more resolution strategies for when performance of the release model 160, with respect to the test dataset 242, is unsatisfactory. The resolution option(s) 246 may be provided by the user. In some cases, the resolution strategy may be to determine a training dataset that includes sample inputs from the test dataset 242 and/or the additional data 244, and retrain the release model 160 using the determined training dataset. In other cases, the resolution strategy may be to apply a deterministic fix to ensure that the prediction task, with respect to the test dataset 242, performs in a satisfactory manner. Deterministic fixes may include generating a finite state transducer (FST), an exact match rule, or other rules that causes output of a specific prediction (or causes other specific processing) with respect to the indicated input.

The release model 160 may be provided (step 10) to the model training component 210, which may include a performance testing component 220 and a performance resolution component 225. The performance testing component 220 may retrieve/receive (step 11) the test dataset 242 from the data storage 240. The performance testing component 220 may process the test dataset 242 using the release model 160 to generate predictions corresponding to the sample inputs included in the test dataset 242. The performance testing component 220 may compare the release model generated predictions and labels (e.g., ground truth) associated with the sample inputs to determine one or more model performance metrics, including but not limited to a prediction accuracy metric. If the prediction accuracy metric (or other performance metrics) satisfies a threshold condition (which may be provided by the user), then the release model 160 may be outputted or otherwise provided (step 14) as a release model 250, which may be used for runtime operations for performing the prediction task on subsequently received inputs. If the prediction accuracy metric (or other performance metrics) do not satisfy the threshold condition, then a performance resolution component 225 may determine further processing to be performed.

The performance resolution component 225 may retrieve/receive (step 12) the resolution option(s) 246. The resolution option(s) 246 may indicate one or more resolution strategies, for example, first attempt to retrain using updated training dataset, and if that fails, then apply a deterministic fix. As another example, the resolution option(s) 246 may indicate to apply a deterministic fix. As yet another example, the resolution option(s) 246 may indicate to retrain the model using updated training dataset.

In some embodiments, the resolution option(s) 246 may be associated with a particular sample pattern or a particular sample input. The performance resolution component 225 (or another component) may determine one or more sample patterns represented in the test dataset 242. Based on the processing performed by the performance testing component 220, the performance resolution component 225 may determine one or more sample patterns with respect to which the release model 160 performance is unsatisfactory. The performance resolution component 225 may perform one or more actions to execute the resolution strategies for those sample patterns.

If the resolution option(s) 246 indicates a training dataset is to be used to retrain the model, then the performance resolution component 225 may retrieve/receive (step 13) the additional data 244. In some embodiments, the performance resolution component 225 may determine a training dataset to include sample inputs from the additional data 244 and/or sample inputs from the test dataset 242. In some embodiments, the performance resolution component 225 may determine a training dataset by adding sample inputs from the additional data 244 and/or the test dataset 242 to the training dataset that was ultimately used to train the release model 160.

Using the determined training dataset, the model training component 210 may train the release model 160. The model training component 210 may perform training epochs/iterations until the model satisfies a threshold condition (e.g., an error condition, a loss, etc.) of the loss/cost function, and/or until the model converges based on the training dataset. In some embodiments, the model training component 140 may perform a certain number of epochs/iterations (e.g., three) and then stop training the model. After training the model (referred to herein as the "trained model"), the performance testing component 220 may test the trained model's performance with respect to the test dataset 242. If the prediction accuracy metric (or other performance metrics) of the trained model satisfies the threshold condition, then the trained model may be outputted or otherwise provided (step 14) as the release model 250. If the prediction accuracy metric (or other performance metrics) does not satisfy the threshold condition, then the performance resolution component 225 may further update the training dataset to retrain the model or apply a deterministic fix depending on the resolution option(s) 246.

In the case that a further updated training dataset is to be determined, the performance resolution component 225 may add further sample inputs from the additional data 244 and/or the test dataset 242 to the training dataset. The model training component 210 may then retrain the release model 160 or the last version of the trained model, and the performance testing component 220 may test the (updated/second) trained model's performance with respect to the test data 242. If the (updated/second) trained model's performance is satisfactory with respect to the test dataset 242, then it may be provided (step 14) as the release model 250. If the (updated/second) trained model's performance is unsatisfactory, then further retraining may be performed or a deterministic fix may be applied.

If the resolution option(s) 246 indicates that a deterministic fix is to be applied, then the performance resolution component 225 may generate one or more deterministic fixes. Such may involve generating a FST, a negative FST, an exact match rule, or other type of rule. The generated deterministic fix(es) may be provided (step 14), along with the release model 160 (or the retrained model) as the release model 250.

Figure 3:
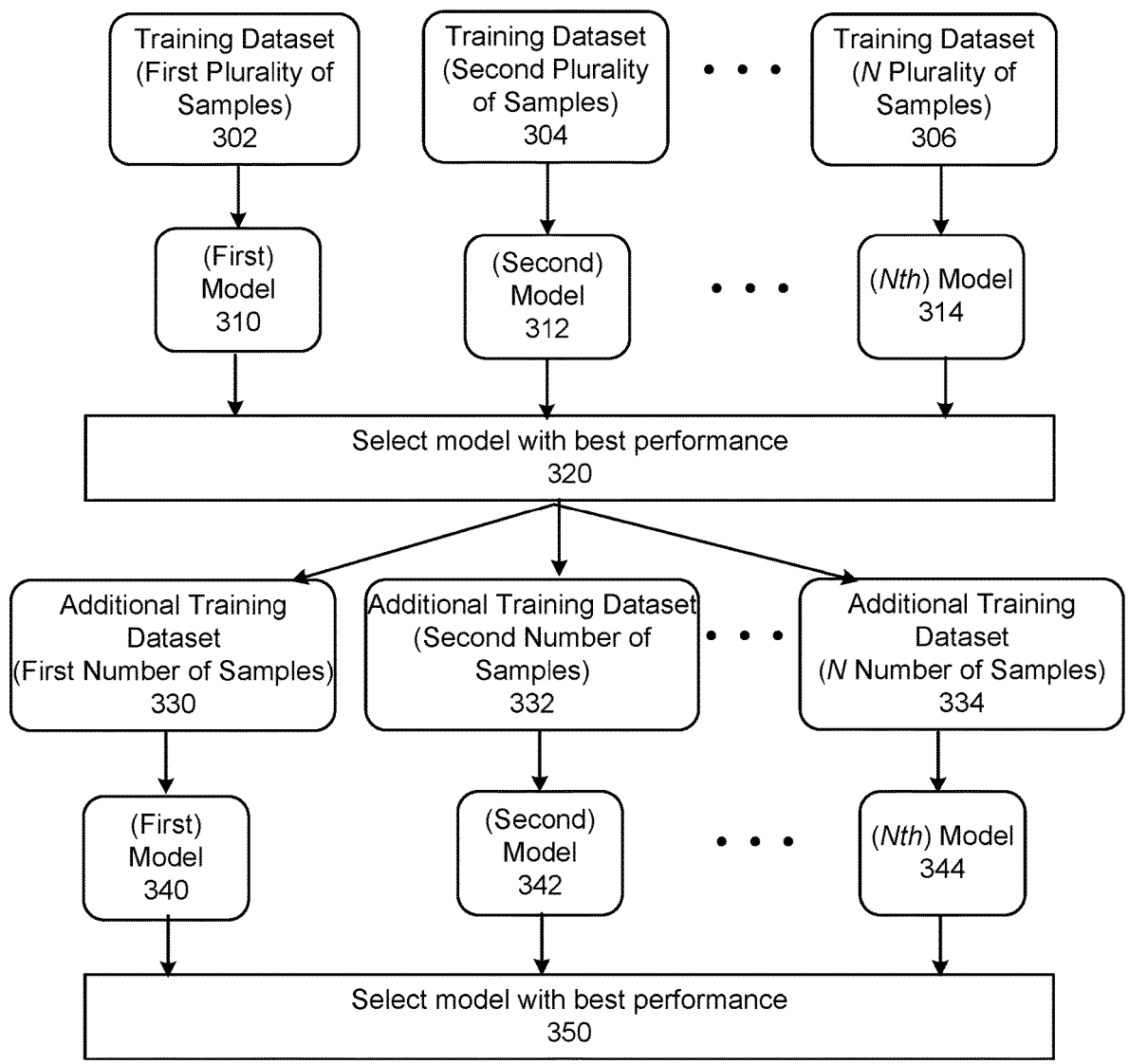
FIG. 3 is a conceptual diagram illustrating training of multiple models in parallel using different amounts of training data, according to embodiments of the present disclosure.

FIG. 3 is a conceptual diagram illustrating training of multiple models, which may be performed in parallel by the system 100 and using different amounts of training data from the same corpus of sample inputs, according to embodiments of the present disclosure. The model training component 140 may be configured to determine a trained model that satisfies one or more performance metrics and that is trained using the least amount of samples needed to satisfy the performance metric(s). To achieve this goal, the model training component 140 may train multiple models in parallel using different numbers of samples in the training dataset.

As shown in FIG. 3, a training dataset 302 may include a first plurality of samples (e.g., twenty-five sample inputs), a training dataset 304 may include a second plurality of samples (e.g., fifty sample inputs), and a training dataset 306 may include a N plurality of samples. The plurality of samples included in the training datasets 302, 304, 306 may be extracted from the training dataset 132 or the corpus of sample inputs generated by the data generation component 120. In other embodiments, each of the training datasets 302, 304, 306 may include different percentages of the training dataset 132 (e.g., fifty percent, sixty-five percent, eighty percent, etc.).

The model training component 140 may train (as described above by performing multiple training epochs/iterations) multiple models using the different training datasets. As shown in FIG. 3, a (first) model 310 may be trained using the training dataset 302, a (second) model 312 may be trained using the training dataset 304, and a (Nth) model 314 may be trained using the training dataset 306. The performance testing component 145 may test the performance of each of the models 310, 312, 314 using the test dataset 134, and may determine a performance metric, including but not limited to, a prediction accuracy metric for each of the models 310, 312, 314.

A component 320 may select for further processing or as the release model 160, from among the models 310, 312, 314, the model with the best performance, which in this case, refers to a model with the best prediction accuracy metric (or other performance metrics) and the smaller number of samples used in the training dataset. For example, assuming that the first plurality of samples in the training dataset 302 is a smaller number than the second plurality of samples in the training dataset 304, and if the prediction accuracy of the (first) model 310 and the (second) model 312 is the same, then the component 320 may select the (first) model 310 since it is trained using a smaller number of samples than the (second) model 312.

For illustration purposes, assume the example case that the prediction accuracy metric of the selected model (determined by the component 320) does not satisfy the threshold condition related to model performance with respect to the test dataset 134, and that an updated training dataset is to be determined to retrain the model. The training data updating component 150 may determine multiple updated training datasets using different number of additional samples. Using the multiple different updated training datasets, the model training component 140 may determine a retrained model that satisfies a performance metric and that is trained using the least number of samples needed to satisfy the performance metric.

As shown in FIG. 3, the training data updating component 150 may determine an additional training dataset 330 using a first number of additional samples (e.g., two additional samples), an additional training dataset 332 using a second number of additional samples (e.g., five additional samples), and an additional training dataset 334 using a N number of additional samples. The training data updating component 150 may add a number of additional samples to the training dataset used to train the selected model (e.g., the training dataset 302 assuming the (first) model 310 is selected).

Using the different updated training datasets 330, 332, 334, the model training component 140 may different multiple different models in parallel. As shown in FIG. 3, a (first) model 340 may be trained using the additional training dataset 330, a (second) model 342 may be trained using the additional training dataset 332, and a (Nth) model 344 may be trained using the additional training dataset 334. The performance testing component 145 may test the performance of each of the models 340, 342, 344 using the test dataset 134, and may determine a performance metric, including but not limited to, a prediction accuracy metric for each of the models 340, 342, 344.

A component 350 (which may be the same as the component 320) may select for further processing or as the release model 160, from among the models 340, 342, 344, the model with the best performance, which in this case, refers to a model with the best prediction accuracy metric (or other performance metrics) and the smaller number of samples used in the training dataset.

Figure 4:
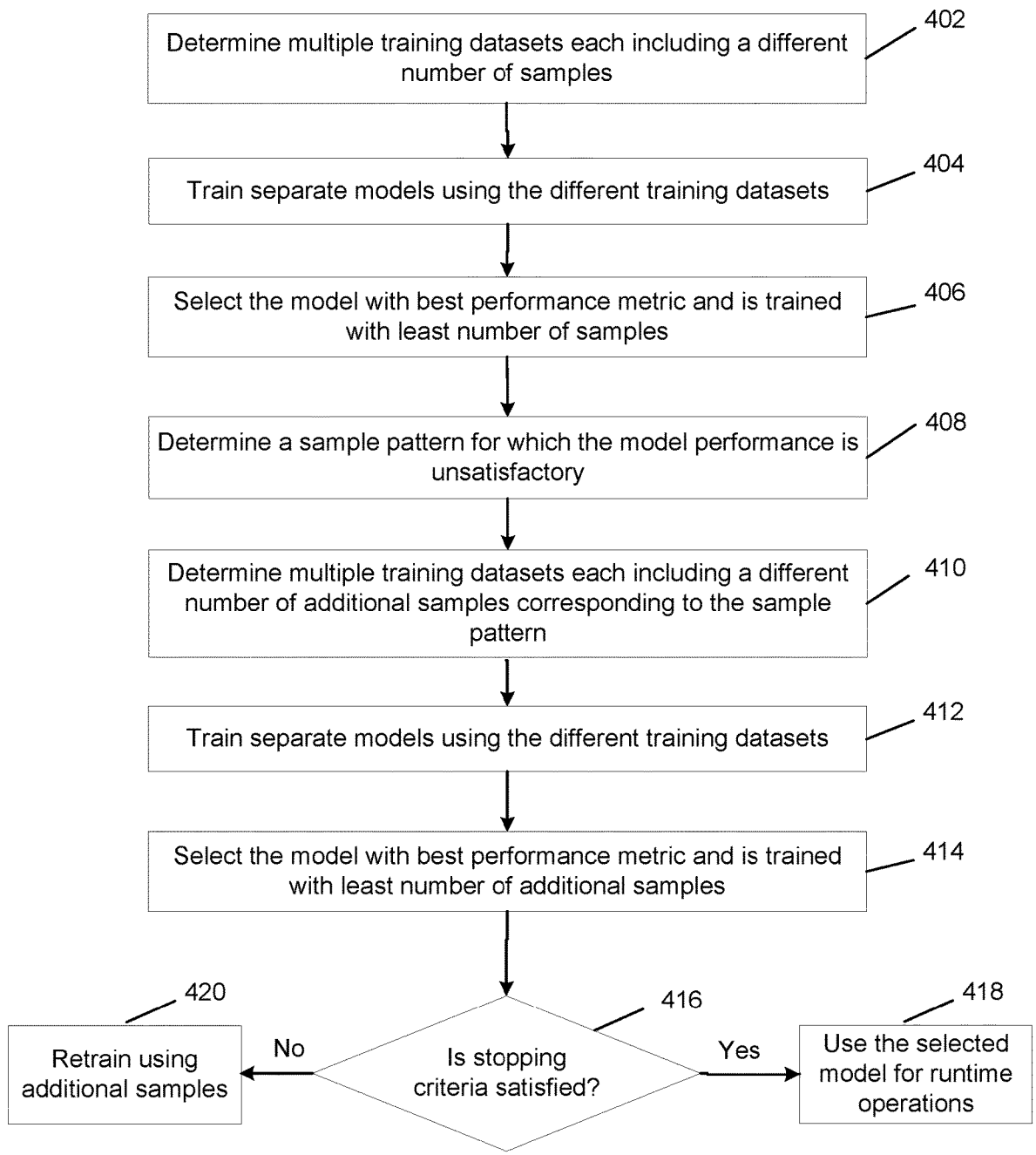
FIG. 4 is a flowchart illustrating an example process that may be performed for automated ML model training, according to embodiments of the present disclosure.

FIG. 4 is a flowchart illustrating an example process that may be performed for automated ML model training as described herein. At a step 402, the system 100 may determine multiple training datasets each including a different number of sample inputs. As described above in relation to FIG. 3, the system 100 may determine the training dataset 302 that may include a first plurality of samples (e.g., twenty-five sample inputs), the training dataset 304 that may include a second plurality of samples (e.g., fifty sample inputs), and the training dataset 306 may include a N plurality of samples. The plurality of samples included in the multiple training datasets may be extracted from the training dataset 132 or the corpus of sample inputs generated by the data generation component 120. In other embodiments, each of the training datasets may include different percentages of the training dataset 132 (e.g., fifty percent, sixty-five percent, eighty percent, etc.). The number of samples to include in individual training dataset may depend on system configuration or a configuration provided by the user. The system or user-provided configuration may define a particular number of samples to include (e.g., 25, 50, 100), or may define a delta/difference number between individual training datasets (e.g., a delta of 25 samples, resulting in training datasets with 25 samples, 50 samples, 75 samples, etc.; delta increase by 50% resulting in training datasets with 24 samples, 36 samples, 54 samples, etc.). The number of training datasets to determine may depend on system configuration or a configuration provided by the user.

At a step 404, the system 100 may train separate models using the different training datasets. As described above in relation to FIG. 3, the system may train, by performing multiple training epochs/iterations, multiple models using the different training datasets. The number epochs/iterations performed during training may depend on system configuration or a configuration provided by the user. As shown in FIG. 3, the first model 310 may be trained using the training dataset 302, the second model 312 may be trained using the training dataset 304, and the Nth model 314 may be trained using the training dataset 306.

At a step 406, the system 100 may select the model with the best performance metric and is trained with the least number of samples. The performance metric may be based on the model's performance with respect to the training dataset after a number of training epochs/iterations, or may be based on the model's performance with respect to the test dataset. The performance testing component 145 may test the performance of each of the models 310, 312, 314, and may determine a performance metric, including but not limited to, an accuracy metric, a precision metric, and a recall metric for each of the models 310, 312, 314. The accuracy metric may describe how the model performs across all classes. The precision metric may be calculated as the ratio between the number of positive samples correctly identified by the model to the total number of samples identified as positive (either correctly or incorrectly). The precision metric may measure the model's accuracy in classifying a sample as positive. The recall metric is calculated as the ratio between the number of positive samples correctly classified as positive to the total number of positive samples included in the dataset. The recall metric may measure the model's ability to detect positive samples. As described above in relation to FIG. 3 (component 320), the system 100 may select the model with the best performance metric as compared to the other trained models. If two models have the same or similar performance metrics, then the system 100 may select the model trained with the least number of samples compared to the other model.

At a step 408, the system 100 may determine a sample pattern (which may be referred to herein as a failing sample pattern) for which the selected model's performance is unsatisfactory. Such determination may be based on the sample inputs in the test dataset for which the generated prediction does not match the ground truth label for the sample input. The particular performance metric and threshold metric value used to evaluate the model's performance with respect to the sample pattern may depend on system configuration or a configuration provided by the user. For example, the user may indicate that a desired model is to have an prediction metric of 95% with respect to the particular sample pattern, and the prediction metric of the trained model (selected in step 406) is below 95% for the sample pattern, then the model's performance in unsatisfactory with respect to the sample pattern.

At a step 410, the system 100 may determine multiple training datasets each including a different number of additional samples corresponding to the failing sample pattern. As described above in relation to FIG. 3, the system 100 may determine the additional training dataset 330 using a first number of additional samples (e.g., two additional samples), the additional training dataset 332 using a second number of additional samples (e.g., five additional samples), and the additional training dataset 334 using a N number of additional samples. The training data updating component 150 may add a number of additional samples to the training dataset used to train the model selected in step 406. The number of additional samples to determine the different additional training dataset may depend on system configuration or a configuration provided by the user. The configuration may be defined as particular numbers (e.g., 2, 5, 10) or particular percentages (e.g., 1%, 3%, 5%) of the initial training dataset.

At a step 412, the system 100 may train separate models using the different training datasets (determined in the step 410). The system 100 may perform multiple training epochs/iterations using the additional training datasets to train the separate models. As described above in relation to FIG. 3, the first model 340 may be trained using the additional training dataset 330, the second model 342 may be trained using the additional training dataset 332, and the Nth model 344 may be trained using the additional training dataset 334.

At a step 414, the system 100 may select the model with the best performance metric and is trained with the least number of additional samples. The performance metric may be based on the model's performance with respect to the training dataset after a number of training epochs/iterations, or may be based on the model's performance with respect to the test dataset. The performance testing component 145 may test the performance of each of the models 340, 342, 344, and may determine a performance metric, including but not limited to, an accuracy metric, a precision metric, and a recall metric for each of the models 340, 342, 344.

At a decision step 416, the system 100 may determine a stopping criteria (for training) is satisfied. The stopping criteria may be one or more of a maximum number of training cycles to perform, a maximum amount of computational time to use, and a minimum performance metric. A single training cycle may involve training a model (using multiple epochs/iterations) using a training dataset. For example, the training performed in step 404 may be one training cycle, and the training performed in step 412 may be another training cycle. The maximum number of training cycles (e.g., 4 cycles, 6 cycles, etc.) may be a system configuration or a user-provided configuration. Computational time may relate to the amount of time a processor(s) or other computational resources are used to configure a model. The maximum amount of computational time (e.g., 48 hours, 3 days, 5 days, etc.) may be a system configuration or a user-provided configuration. The performance metric may be, but is not limited to, an accuracy metric, a precision metric and/or a recall metric. Other stopping criteria may also be used. One or more of the stopping criterion may be a system configuration or a user-provided configuration. If the stopping criteria includes a minimum performance metric, then the system 100 may determine if the selected model's performance with respect to the test dataset 134 is satisfactory. If the stopping criteria is satisfied, then at a step 418, the system 100 may use the selected model for runtime operations (i.e. the release model 160). If the stopping criteria is not satisfied, then at a step 420, the system 100 may retrain the selected model using additional sample inputs (in a similar manner as described in relation to step 410).

Figure 5:
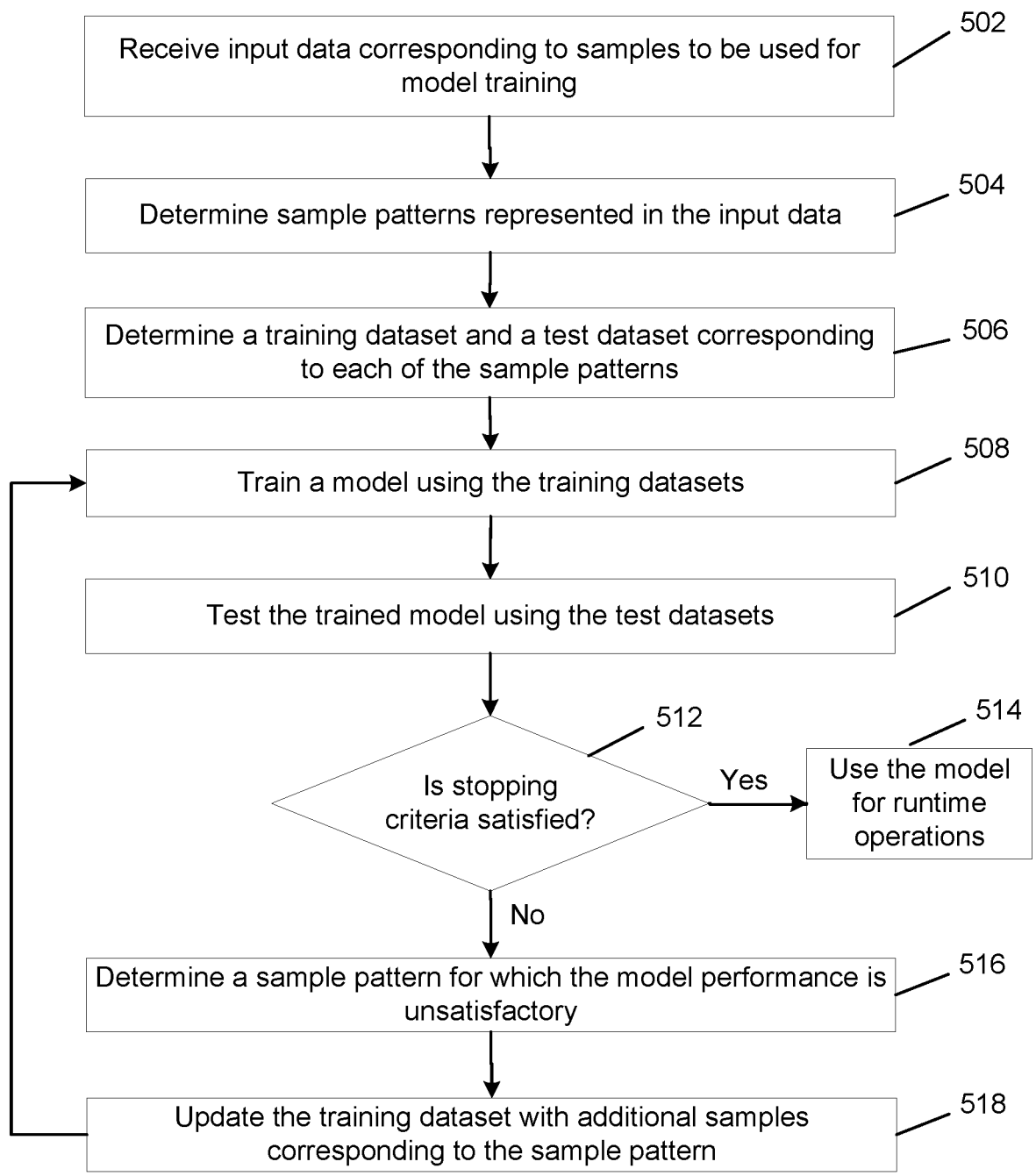
FIG. 5 is a flowchart illustrating another example process that may be performed for automated ML model training, according to embodiments of the present disclosure.

FIG. 5 is a flowchart illustrating another example process that may be performed for automated ML model training as described herein. At a step 502, the system 100 may receive the input data 110 corresponding to samples to be used for model training. At a step 504, the system 100 may determine sample patterns represented in the input data 110. As described above in relation to FIG. 1, the pattern recognition component 125 may determine a pattern based on words included in a natural language input(s) (e.g., a first pattern may be "play [videoname]", a second pattern may be "play [videoname] by [artist name]", etc.). In other examples, when the samples and prediction task relates to image processing, the system 100 may determine patterns in sample image inputs based on the colors included in the images. As yet another example, patterns in audio inputs may be based on the frequencies included in the audio. As yet another example, patterns in image inputs may be based on the pixels included in the image.

At a step 506, the system 100 may determine a training dataset and a test dataset corresponding to each of the sample patterns. As described above in relation to FIG. 1, the data generation component 120 may generate a corpus of sample inputs, and may select a portion of corpus for training datasets and another portion (e.g., a non-overlapping portion) of the corpus for test datasets. Individual training datasets and test datasets may be associated with a sample pattern.

At a step 508, the system 100 may train a model using the training datasets corresponding to each of the sample patterns. Thus, the trained model may be configured to perform a prediction task with respect to multiple sample patterns (e.g., "play [videoname]", "play [videoname] by [artist name]", etc.). The model may be trained as described above in relation to FIG. 1 and the model training component 140.

At a step 510, the system 100 may test the trained model using the test datasets corresponding to each of the sample patterns. At a decision step 512, the system 100 may determine whether a stopping criteria (with respect to training the model) is satisfied. As described above, the stopping criteria may be one or more of a maximum number of training cycles to perform, a maximum amount of computational time to use, a minimum performance metric, and/or other criteria. One or more of the stopping criterion may be a system configuration or a user-provided configuration. A minimum performance metric may be applicable to all sample patterns. In other cases, separate minimum performance metrics may be defined for individual sample patterns. For example, the user may indicate a first minimum accuracy metric for a first sample pattern (e.g., "play [videoname]") and a second (different) minimum accuracy metric for a second sample pattern (e.g., "play [videoname] by [artist name]"). The system 100 may test the trained model using the test datasets corresponding to each of the sample patterns to determine whether a stopping criteria related to minimum performance metric is satisfied. The system 100 may instead or additionally determine whether the maximum number of training cycles have been performed and/or the maximum amount of computational time has been used.

If the stopping criteria is satisfied (determined at decision step 512), then at a step 514, the system 100 may use the trained model for runtime operations (or for further processing).

If the stopping criteria is not satisfied (as determined at decision step 512), then at a step 516, the system 100 may determine a sample pattern (which may be referred to herein as a failing sample pattern) for which the minimum performance metric is not satisfied. The system 100 may make this determination based on the trained model's processing of the individual test datasets and the sample pattern associated with the test dataset. At a step 518, the system 100 may update the training dataset (corresponding to the failing sample pattern) with additional sample inputs corresponding to the failing sample pattern, as described above in relation to FIG. 1. The process may then loop back to the step 508, where the system 100 may train a model using the training datasets corresponding to the sample patterns, and including the updated training dataset (with the additional sample inputs) corresponding to the failing sample pattern. The system 100 may update the training dataset and train a model again if the stopping criteria is not satisfied, and when the stopping criteria is satisfied (e.g., the maximum number of training cycles performed, the maximum amount of computation time used, the minimum performance metric is satisfied, etc.), the model will be provided for runtime operations.

Figure 6:
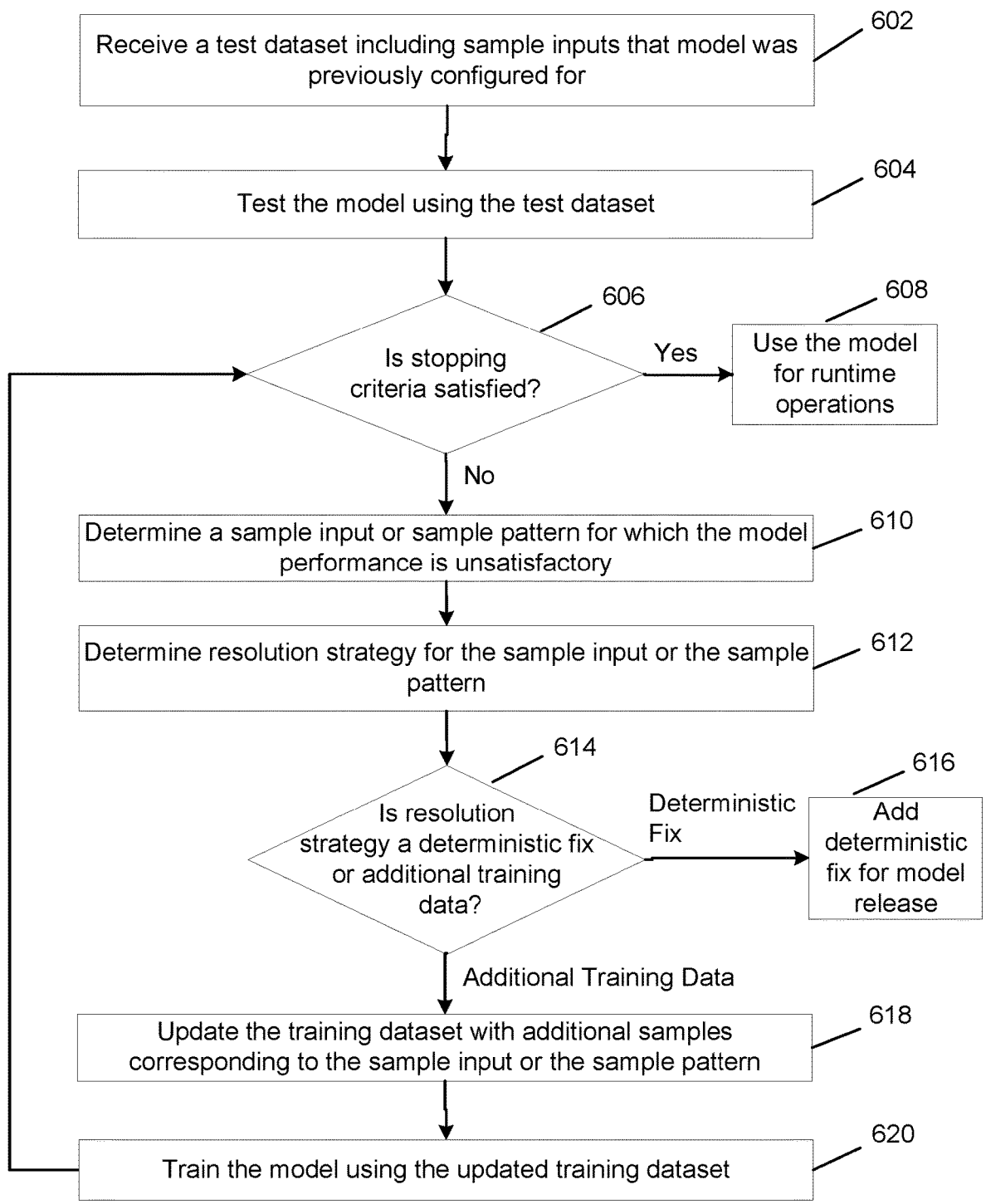
FIG. 6 is a flowchart illustrating yet another example process that may be performed for automated ML model training, according to embodiments of the present disclosure.

FIG. 6 is a flowchart illustrating yet another example process that may be performed for automated ML model training as described herein. At a step 602, the system 100 may receive the test dataset 242 including sample inputs (which may be referred to herein as existing features) that a model was previously configured for. At a step 604, the system 100 may test the release model 160 using the test dataset 242, as described above in relation to FIG. 2. At a decision step 606, the system 100 may determine if a stopping criteria is satisfied. As described herein, the stopping criteria may be one or more of a maximum number of training cycles to perform, a maximum amount of computational time to use, a minimum performance metric, and other criteria. One or more of the stopping criterion may be a system configuration or a user-provided configuration. The system 100 may test the model performance with respect to the test dataset to determine whether the minimum performance metric is satisfied. If the stopping criteria is satisfied, then at a step 608, the system 100 may use the model for runtime operations.

If the stopping criteria is not satisfied, then at a step 610, the system 100 may determine a sample input(s) or sample pattern(s) for which the model performance fails the minimum performance metric (which may be referred to herein as a failing sample input or failing sample pattern). At a step 612, the system 100 may determine, as described above in relation to FIG. 2, a resolution strategy (using the resolution option(s) 246) for the failing sample input(s) or failing sample pattern(s).

At a decision step 614, the system 100 may determine whether the resolution strategy is a deterministic fix or retraining with additional training data. In the case that the resolution strategy is a deterministic fix, at a step 616, the system 100 may add a deterministic fix for model release. Deterministic fixes may include generating a finite state transducer (FST), an exact match rule, or other rules that causes output of a specific prediction (or causes other specific processing) with respect to the indicated input.

In the case that the resolution strategy is retraining with additional training data, at a step 618, the system 100 may update the training dataset (which was used to determine the trained model/the release model 160) with additional samples corresponding to the failing sample input or the failing sample pattern, as described above in relation to FIG. 2. At a step 620, the system 100 may train the model using the updated training dataset. The process may then loop back to the decision step 606 to determine whether the stopping criteria is satisfied, and one or more of the above steps may be performed with respect to the retrained model.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 7:
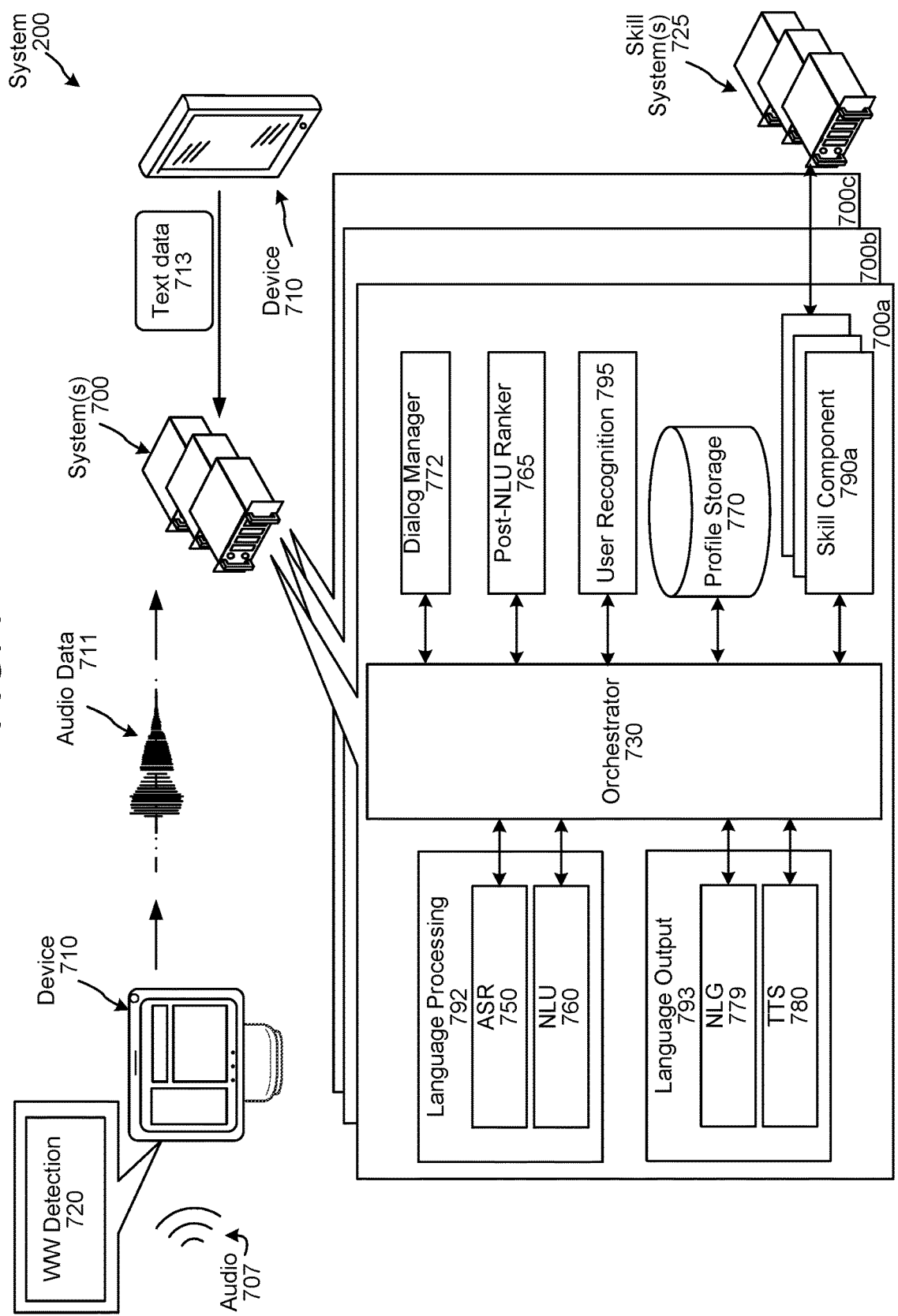
FIG. 7 is a conceptual diagram of components of the system, according to embodiments of the present disclosure.

FIG. 7 is a conceptual diagram illustrating a virtual assistant system 200 for natural language processing, according to embodiments of the present disclosure. As shown in FIG. 7, the virtual assistant system 200 may include a voice-enabled device 710, a natural language command processing system 700 (abbreviated "system 700"), and one or more skill support systems 725 connected across one or more networks 199. One or more components of the system 700 may employ a ML model(s). Such ML model(s) may be configured using the automated ML training techniques described herein. For example, a NLU component 760 may involve a task of domain classification, performed using a ML model(s) that may be configured to classify natural language inputs such as "play [first videoname]", "play [second videoname]", "play [first videoname] by [first artist name]", etc. to a video domain. Domain classification may further involve identifying portions of an input that correspond to intent (e.g., "play") and portions of an input that correspond to an entity (e.g., "[first videoname]", "[first artist name]").

The device 710 may receive audio 707 corresponding to a spoken natural language input originating from a user. The device 710 may process audio following detection of a wakeword. The device 710 may generate audio data 711 corresponding to the audio 707, and may send the audio data to the system 700. The device 710 may send the audio data to the system 700 via an application that is installed on the device 710 and associated with the system 700. An example of such an application is the Amazon Alexa application that may be installed on a smart phone, tablet, or the like. In some implementations, the device 710 may receive text data 713 corresponding to a natural language input originating from the user, and send the text data to the system 700. The device 710 may also receive output data from the system 700, and generate a synthesized speech output. The device 710 may include a camera for capturing image and/or video data for processing by the system 700. Examples of various devices 710 are further illustrated in FIG. 11. The system 700 may be remote system such as a group of computing components located geographically remote from device 710 but accessible via network 199 (for example, servers accessible via the internet). The system 700 may also include a remote system that is physically separate from device 710 but located geographically close to device 710 and accessible via network 199 (for example a home server located in a same residence as device 710). System 700 may also include some combination thereof, for example where certain components/operations are performed via a home server(s) and others are performed via a geographically remote server(s).

The system 200 may operate using various components as described in FIG. 7. The various components may be located on same or different physical devices. Communication between various components may occur directly or across a network(s) 199. The device 710 may include audio capture component(s), such as a microphone or array of microphones of a device 710, captures audio 707 and creates corresponding audio data. Once speech is detected in audio data representing the audio 707, the device 710 may determine if the speech is directed at the device 710/system 700. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of device 710. Other input forms may include indication that the user has pressed a physical or virtual button on device 710, the user has made a gesture, etc. The device 710 may also capture images using camera(s) 918 of the device 710 and may send image data representing those image(s) to the system 700. The image data may include raw image data or image data processed by the device 710 before sending to the system 700. The image data may be used in various manners by different components of the system to perform operations such as determining whether a user is directing an utterance to the system, interpreting a user command, responding to a user command, etc.

The wakeword detector 720 of the device 710 may process the audio data, representing the audio 707, to determine whether speech is represented therein. The device 710 may use various techniques to determine whether the audio data includes speech. In some examples, the device 710 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 710 may implement a classifier configured to distinguish speech from background noise. The classifier may be implemented by techniques such as linear classifiers, support vector machines, and decision trees. In still other examples, the device 710 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 707, is analyzed to determine if specific characteristics of the audio data match preconfigured acoustic waveforms, audio signatures, or other data corresponding to a wakeword. Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 720 and/or input is detected by an input detector, the device 710 may "wake" and begin transmitting audio data 711, representing the audio 707, to the system(s) 700. The audio data 711 may include data corresponding to the wakeword; in other embodiments, the portion of the audio corresponding to the wakeword is removed by the device 710 prior to sending the audio data 711 to the system(s) 700. In the case of touch input detection or gesture based input detection, the audio data may not include a wakeword.

In some implementations, the system 200 may include more than one system 700. The systems 700 may respond to different wakewords and/or perform different categories of tasks. Each system 700 may be associated with its own wakeword such that speaking a certain wakeword results in audio data be sent to and processed by a particular system. For example, detection of the wakeword "Alexa" by the wakeword detector 720 may result in sending audio data to system 700*a* for processing while detection of the wakeword "Computer" by the wakeword detector may result in sending audio data to system 700*b* for processing. The system may have a separate wakeword and system for different skills/systems (e.g., "Dungeon Master" for a game play skill/system 700*c*) and/or such skills/systems may be coordinated by one or more skill(s) 790 of one or more systems 700.

Upon receipt by the system(s) 700, the audio data 711 may be sent to an orchestrator component 730. The orchestrator component 730 may include memory and logic that enables the orchestrator component 730 to transmit various pieces and forms of data to various components of the system, as well as perform other operations as described herein.

The orchestrator component 730 may send the audio data 711 to a language processing component 792. The language processing component 792 (sometimes also referred to as a spoken language understanding (SLU) component) includes an automatic speech recognition (ASR) component 750 and a natural language understanding (NLU) component 760. The ASR component 750 may transcribe the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., acoustic units such as phonemes, senons, phones, etc.) and sequences of sounds to identify words that match the sequence of sounds of the speech represented in the audio data 711. The ASR component 750 sends the text data generated thereby to an NLU component 760, via, in some embodiments, the orchestrator component 730. The text data sent from the ASR component 750 to the NLU component 760 may include a single top-scoring ASR hypothesis or may include an N-best list including multiple top-scoring ASR hypotheses. An N-best list may additionally include a respective score associated with each ASR hypothesis represented therein.

The speech processing system 792 may further include a NLU component 760. The NLU component 760 may receive the text data from the ASR component. The NLU component 760 may attempts to make a semantic interpretation of the phrase(s) or statement(s) represented in the text data input therein by determining one or more meanings associated with the phrase(s) or statement(s) represented in the text data. The NLU component 760 may determine an intent representing an action that a user desires be performed and may determine information that allows a device (e.g., the device 710, the system(s) 700, a skill component 790, a skill system(s) 725, etc.) to execute the intent. For example, if the text data corresponds to "play the 5th Symphony by Beethoven," the NLU component 760 may determine an intent that the system output music and may identify "Beethoven" as an artist/composer and "5th Symphony" as the piece of music to be played. For further example, if the text data corresponds to "what is the weather," the NLU component 760 may determine an intent that the system output weather information associated with a geographic location of the device 710. In another example, if the text data corresponds to "turn off the lights," the NLU component 760 may determine an intent that the system turn off lights associated with the device 710 or the user. However, if the NLU component 760 is unable to resolve the entity—for example, because the entity is referred to by anaphora such as "this song" or "my next appointment"—the speech processing system 792 can send a decode request to another speech processing system 792 for information regarding the entity mention and/or other context related to the utterance. The speech processing system 792 may augment, correct, or base results data upon the audio data 711 as well as any data received from the other speech processing system 792.

The NLU component 760 may return NLU results data (which may include tagged text data, indicators of intent, etc.) back to the orchestrator 730. The orchestrator 730 may forward the NLU results data to a skill component(s) 790. If the NLU results data includes a single NLU hypothesis, the NLU component 760 and the orchestrator component 730 may direct the NLU results data to the skill component(s) 790 associated with the NLU hypothesis. If the NLU results data 585/525 includes an N-best list of NLU hypotheses, the NLU component 760 and the orchestrator component 730 may direct the top scoring NLU hypothesis to a skill component(s) 790 associated with the top scoring NLU hypothesis. The system may also include a post-NLU ranker 765 which may incorporate other information to rank potential interpretations determined by the NLU component 760. The local device 710 may also include its own post-NLU ranker 865, which may operate similarly to the post-NLU ranker 765.

A skill component may be software running on the system(s) 700 that is akin to a software application. That is, a skill component 790 may enable the system(s) 700 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 700 may be configured with more than one skill component 790. For example, a weather service skill component may enable the system(s) 700 to provide weather information, a car service skill component may enable the system(s) 700 to book a trip with respect to a taxi or ride sharing service, a restaurant skill component may enable the system(s) 700 to order a pizza with respect to the restaurant's online ordering system, etc. A skill component 790 may operate in conjunction between the system(s) 700 and other devices, such as the device 710, in order to complete certain functions. Inputs to a skill component 790 may come from speech processing interactions or through other interactions or input sources. A skill component 790 may include hardware, software, firmware, or the like that may be dedicated to a particular skill component 790 or shared among different skill components 790.

A skill support system(s) 725 may communicate with a skill component(s) 790 within the system(s) 700 and/or directly with the orchestrator component 730 or with other components. A skill support system(s) 725 may be configured to perform one or more actions. An ability to perform such action(s) may sometimes be referred to as a "skill." That is, a skill may enable a skill support system(s) 725 to execute specific functionality in order to provide data or perform some other action requested by a user. For example, a weather service skill may enable a skill support system(s) 725 to provide weather information to the system(s) 700, a car service skill may enable a skill support system(s) 725 to book a trip with respect to a taxi or ride sharing service, an order pizza skill may enable a skill support system(s) 725 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 700 may be configured with a skill component 790 dedicated to interacting with the skill support system(s) 725. Unless expressly stated otherwise, reference to a skill, skill device, or skill component may include a skill component 790 operated by the system(s) 700 and/or skill operated by the skill support system(s) 725. Moreover, the functionality described herein as a skill or skill may be referred to using many different terms, such as an action, bot, app, or the like. The skill 790 and or skill support system(s) 725 may return output data to the orchestrator 730.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 200 may include a dialog manager component 772 that manages and/or tracks a dialog between a user and a device. As used herein, a "dialog" may refer to data transmissions (such as relating to multiple user inputs and system 200 outputs) between the system 200 and a user (e.g., through device(s) 710) that all relate to a single "conversation" between the system and the user that may have originated with a single user input initiating the dialog. Thus, the data transmissions of a dialog may be associated with a same dialog identifier, which may be used by components of the overall system 200 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 200 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 772 may associate a dialog session identifier with the dialog upon identifying that the user is engaging in a dialog with the user. The dialog manager component 772 may track a user input and the corresponding system generated response to the user input as a turn. The dialog session identifier may correspond to multiple turns of user input and corresponding system generated response. The dialog manager component 772 may transmit data identified by the dialog session identifier directly to the orchestrator component 730 or other component. Depending on system configuration the dialog manager 772 may determine the appropriate system generated response to give to a particular utterance or user input of a turn. Or creation of the system generated response may be managed by another component of the system (e.g., the language output component 793, NLG 779, orchestrator 730, etc.) while the dialog manager 772 selects the appropriate responses. Alternatively, another component of the system(s) 700 may select responses using techniques discussed herein. The text of a system generated response may be sent to a TTS component 780 for creation of audio data corresponding to the response. The audio data may then be sent to a user device (e.g., device 710) for ultimate output to the user. Alternatively (or in addition) a dialog response may be returned in text or some other form.

The dialog manager 772 may receive the ASR hypothesis/hypotheses (i.e., text data) and make a semantic interpretation of the phrase(s) or statement(s) represented therein. That is, the dialog manager 772 determines one or more meanings associated with the phrase(s) or statement(s) represented in the text data based on words represented in the text data. The dialog manager 772 determines a goal corresponding to an action that a user desires be performed as well as pieces of the text data that allow a device (e.g., the device 710, the system(s) 700, a skill 790, a skill system(s) 725, etc.) to execute the intent. If, for example, the text data corresponds to "what is the weather," the dialog manager 772 may determine that that the system(s) 700 is to output weather information associated with a geographic location of the device 710. In another example, if the text data corresponds to "turn off the lights," the dialog manager 772 may determine that the system(s) 700 is to turn off lights associated with the device(s) 710 or the user(s).

The dialog manager 772 may send the results data to one or more skill(s) 790. If the results data includes a single hypothesis, the orchestrator component 730 may send the results data to the skill(s) 790 associated with the hypothesis. If the results data includes an N-best list of hypotheses, the orchestrator component 730 may send the top scoring hypothesis to a skill(s) 790 associated with the top scoring hypothesis.

The system 700 includes a language output component 793. The language output component 793 includes a natural language generation (NLG) component 779 and a text-to-speech (TTS) component 780. The NLG component 779 can generate text for purposes of TTS output to a user. For example the NLG component 779 may generate text corresponding to instructions corresponding to a particular action for the user to perform. The NLG component 779 may generate appropriate text for various outputs as described herein. The NLG component 779 may include one or more trained models configured to output text appropriate for a particular input. The text output by the NLG component 779 may become input for the TTS component 780. Alternatively or in addition, the TTS component 780 may receive text data from a skill 790 or other system component for output.

The NLG component 779 may include a trained model. The NLG component 779 generates text data from dialog data received by the dialog manager 772 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 780.

The TTS component 780 may generate audio data (e.g., synthesized speech) from text data using one or more different methods. Text data input to the TTS component 780 may come from a skill component 790, the orchestrator component 730, or another component of the system. In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The device 710 may include still image and/or video capture components such as a camera or cameras to capture one or more images. The device 710 may include circuitry for digitizing the images and/or video for transmission to the system(s) 700 as image data. The device 710 may further include circuitry for voice command-based control of the camera, allowing a user to request capture of image or video data. The device 710 may process the commands locally or send audio data 711 representing the commands to the system(s) 700 for processing, after which the system(s) 700 may return output data that can cause the device 710 to engage its camera.

The system(s) 700 may include a user recognition component 795 that recognizes one or more users using a variety of data. However, the disclosure is not limited thereto, and the device 710 may include a user recognition component 895 instead of and/or in addition to user recognition component 795 of the system(s) 700 without departing from the disclosure. User recognition component 895 operates similarly to user recognition component 795.

The user-recognition component 795 may take as input the audio data 711 and/or text data output by the ASR component 750. The user-recognition component 795 may perform user recognition by comparing audio characteristics in the audio data 711 to stored audio characteristics of users. The user-recognition component 795 may also perform user recognition by comparing biometric data (e.g., fingerprint data, iris data, etc.), received by the system in correlation with the present user input, to stored biometric data of users assuming user permission and previous authorization. The user-recognition component 795 may further perform user recognition by comparing image data (e.g., including a representation of at least a feature of a user), received by the system in correlation with the present user input, with stored image data including representations of features of different users. The user-recognition component 795 may perform additional user recognition processes, including those known in the art.

The user-recognition component 795 determines scores indicating whether user input originated from a particular user. For example, a first score may indicate a likelihood that the user input originated from a first user, a second score may indicate a likelihood that the user input originated from a second user, etc. The user-recognition component 795 also determines an overall confidence regarding the accuracy of user recognition operations.

Output of the user-recognition component 795 may include a single user identifier corresponding to the most likely user that originated the user input. Alternatively, output of the user-recognition component 795 may include an N-best list of user identifiers with respective scores indicating likelihoods of respective users originating the user input. The output of the user-recognition component 795 may be used to inform NLU processing as well as processing performed by other components of the system.

The system 200 (either on device 710, system 700, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 710, the user profile (associated with the presented login information) may be updated to include information about the device 710, for example with an indication that the device is currently in use. Each user profile may include identifiers of skills that the user has enabled. When a user enables a skill, the user is providing the system 700 with permission to allow the skill to execute with respect to the user's natural language user inputs. If a user does not enable a skill, the system 700 may not invoke the skill to execute with respect to the user's natural language user inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 8:
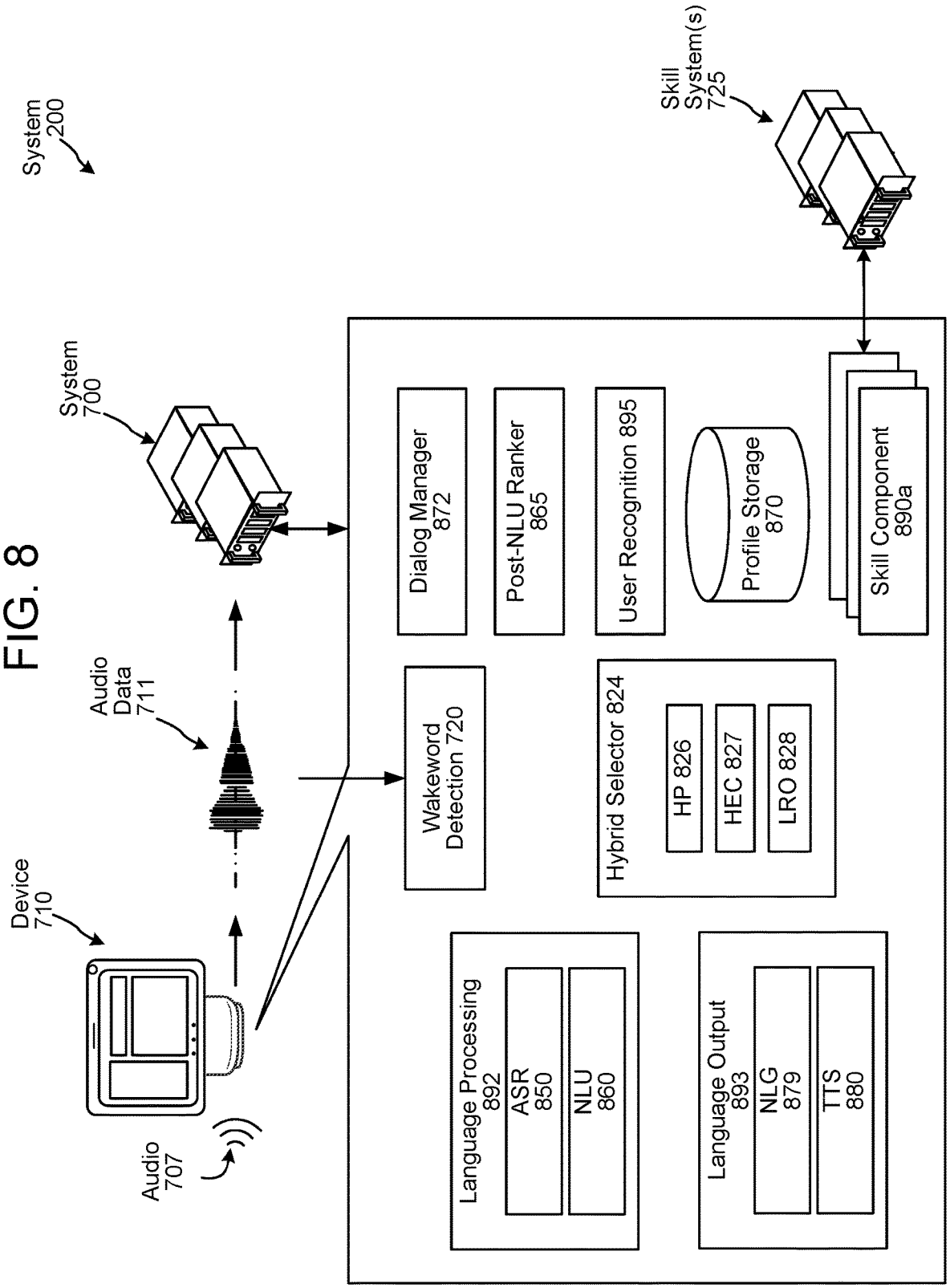
FIG. 8 is a conceptual diagram illustrating components that may be included in a device, according to embodiments of the present disclosure.

Although the components of FIG. 7 may be illustrated as part of system(s) 700, device 710, or otherwise, the components may be arranged in other device(s) (such as in device 710 if illustrated in system(s) 700 or vice-versa, or in other device(s) altogether) without departing from the disclosure. FIG. 8 illustrates such a configured device 710. One or more components of the device 710 may employ a ML model(s). Such ML model(s) may be configured using the automated ML training techniques described herein.

In at least some embodiments, the system 700 may receive the audio data 711 from the device 710, to recognize speech corresponding to a spoken input in the received audio data 711, and to perform functions in response to the recognized speech. In at least some embodiments, these functions involve sending directives (e.g., commands), from the system 700 to the device 710 (and/or other devices 710) to cause the device 710 to perform an action, such as output an audible response to the spoken input via a loudspeaker(s), and/or control secondary devices in the environment by sending a control command to the secondary devices.

Thus, when the device 710 is able to communicate with the system 700 over the network(s) 199, some or all of the functions capable of being performed by the system 700 may be performed by sending one or more directives over the network(s) 199 to the device 710, which, in turn, may process the directive(s) and perform one or more corresponding actions. For example, the system 700, using a remote directive that is included in response data (e.g., a remote response), may instruct the device 710 to output an audible response (e.g., using TTS processing performed by an on-device TTS component 880) to a user's question via a loudspeaker(s) of (or otherwise associated with) the device 710, to output content (e.g., music) via the loudspeaker(s) of (or otherwise associated with) the device 710, to display content on a display of (or otherwise associated with) the device 710, and/or to send a directive to a secondary device (e.g., a directive to turn on a smart light). It is to be appreciated that the system 700 may be configured to provide other functions in addition to those discussed herein, such as, without limitation, providing step-by-step directions for navigating from an origin location to a destination location, conducting an electronic commerce transaction on behalf of the user as part of a shopping function, establishing a communication session (e.g., a video call) between the user and another user, and so on.

As noted with respect to FIG. 7, the device 710 may include a wakeword detection component 720 configured to compare the audio data 711 to stored models used to detect a wakeword (e.g., "Alexa") that indicates to the device 710 that the audio data 711 is to be processed for determining NLU output data (e.g., slot data that corresponds to a named entity, label data, and/or intent data, etc.). In at least some embodiments, a hybrid selector 824, of the device 710, may send the audio data 711 to the wakeword detection component 720. If the wakeword detection component 720 detects a wakeword in the audio data 711, the wakeword detection component 720 may send an indication of such detection to the hybrid selector 824. In response to receiving the indication, the hybrid selector 824 may send the audio data 711 to the system 700 and/or the ASR component 850. The wakeword detection component 720 may also send an indication, to the hybrid selector 824, representing a wakeword was not detected. In response to receiving such an indication, the hybrid selector 824 may refrain from sending the audio data 711 to the system 700, and may prevent the ASR component 850 from further processing the audio data 711. In this situation, the audio data 711 can be discarded.

The device 710 may conduct its own speech processing using on-device language processing components, such as an SLU/language processing component 892 (which may include an ASR component 850 and an NLU 860), similar to the manner discussed herein with respect to the SLU component 792 (or ASR component 750 and the NLU component 760) of the system 700. Language processing component 892 may operate similarly to language processing component 792, ASR component 850 may operate similarly to ASR component 750 and NLU component 860 may operate similarly to NLU component 760. The device 710 may also internally include, or otherwise have access to, other components such as one or more skill components 890 capable of executing commands based on NLU output data or other results determined by the device 710/system 700 (which may operate similarly to skill components 790), a user recognition component 895 (configured to process in a similar manner to that discussed herein with respect to the user recognition component 795 of the system 700), profile storage 870 (configured to store similar profile data to that discussed herein with respect to the profile storage 770 of the system 700), dialog manager component 872 (configured to process in a similar manner as the dialog manager component 772), or other components. In at least some embodiments, the profile storage 870 may only store profile data for a user or group of users specifically associated with the device 710. Similar to as described above with respect to skill component 790, a skill component 890 may communicate with a skill system(s) 725. The device 710 may also have its own language output component 893 which may include NLG component 879 and TTS component 880. Language output component 893 may operate similarly to language processing component 793, NLG component 879 may operate similarly to NLG component 779 and TTS component 880 may operate similarly to TTS component 780.

In at least some embodiments, the on-device language processing components may not have the same capabilities as the language processing components of the system 700. For example, the on-device language processing components may be configured to handle only a subset of the natural language user inputs that may be handled by the system 700. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 700. If the device 710 attempts to process a natural language user input for which the on-device language processing components are not necessarily best suited, the language processing results determined by the device 710 may indicate a low confidence or other metric indicating that the processing by the device 710 may not be as accurate as the processing done by the system 700.

The hybrid selector 824, of the device 710, may include a hybrid proxy (HP) 826 configured to proxy traffic to/from the system 700. For example, the HP 826 may be configured to send messages to/from a hybrid execution controller (HEC) 827 of the hybrid selector 824. For example, command/directive data received from the system 700 can be sent to the HEC 827 using the HP 826. The HP 826 may also be configured to allow the audio data 711 to pass to the system 700 while also receiving (e.g., intercepting) this audio data 711 and sending the audio data 711 to the HEC 827.

In at least some embodiments, the hybrid selector 824 may further include a local request orchestrator (LRO) 828 configured to notify the ASR component 850 about the availability of new audio data 711 that represents user speech, and to otherwise initiate the operations of local language processing when new audio data 711 becomes available. In general, the hybrid selector 824 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 710 receives directive data from the system 700 and chooses to use that remotely-determined directive data.

Thus, when the audio data 711 is received, the HP 826 may allow the audio data 711 to pass through to the system 700 and the HP 826 may also input the audio data 711 to the on-device ASR component 850 by routing the audio data 711 through the HEC 827 of the hybrid selector 824, whereby the LRO 828 notifies the ASR component 850 of the audio data 711. At this point, the hybrid selector 824 may wait for response data from either or both of the system 700 or the local language processing components. However, the disclosure is not limited thereto, and in some examples the hybrid selector 824 may send the audio data 711 only to the local ASR component 850 without departing from the disclosure. For example, the device 710 may process the audio data 711 locally without sending the audio data 711 to the system 700.

The local ASR component 850 is configured to receive the audio data 711 from the hybrid selector 824, and to recognize speech in the audio data 711, and the local NLU component 860 is configured to determine a user intent from the recognized speech, and to determine how to act on the user intent by generating NLU output data which may include directive data (e.g., instructing a component to perform an action). Such NLU output data may take a form similar to that as determined by the NLU component 760 of the system 700. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 860) may be selected as usable to respond to a natural language user input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language user input, to use directive data received from the system 700, assuming a remote response is even received (e.g., when the device 710 is able to access the system 700 over the network(s) 199), or to determine output audio requesting additional information from the user.

The device 710 and/or the system 700 may associate a unique identifier with each natural language user input. The device 710 may include the unique identifier when sending the audio data 711 to the system 700, and the response data from the system 700 may include the unique identifier to identify which natural language user input the response data corresponds.

In at least some embodiments, the device 710 may include, or be configured to use, one or more skill components 890 that may work similarly to the skill component(s) 790 implemented by the system 700. The skill component(s) 890 may correspond to one or more domains that are used in order to determine how to act on a spoken input in a particular way, such as by outputting a directive that corresponds to the determined intent, and which can be processed to implement the desired operation. The skill component(s) 890 installed on the device 710 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 710 may be in communication with one or more skill systems 725. For example, a skill system 725 may be located in a remote environment (e.g., separate location) such that the device 710 may only communicate with the skill system 725 via the network(s) 199. However, the disclosure is not limited thereto. For example, in at least some embodiments, a skill system 725 may be configured in a local environment (e.g., home server and/or the like) such that the device 710 may communicate with the skill system 725 via a private network, such as a local area network (LAN).

As used herein, a "skill" may refer to a skill component 890, a skill system 725, or a combination of a skill component 890 and a corresponding skill system 725.

Similar to the manner discussed with regard to FIG. 7, the local device 710 may be configured to recognize multiple different wakewords and/or perform different categories of tasks depending on the wakeword. Such different wakewords may invoke different processing components of local device 710 (not illustrated in FIG. 8). For example, detection of the wakeword "Alexa" by the wakeword detector 720 may result in sending audio data to certain language processing components 892/skills 890 for processing while detection of the wakeword "Computer" by the wakeword detector may result in sending audio data different language processing components 892/skills 890 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
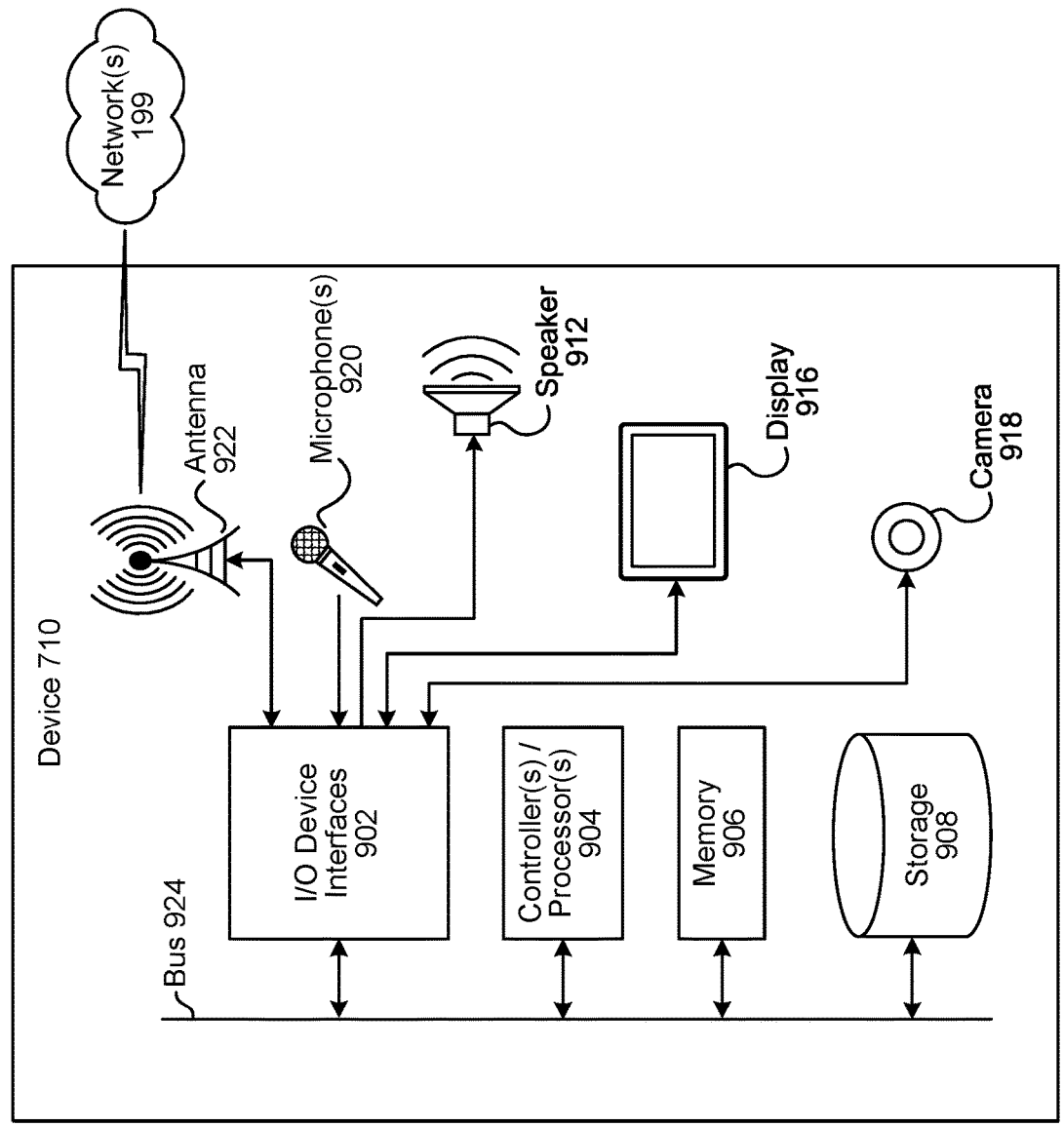
FIG. 9 is a block diagram conceptually illustrating example components of a device, according to embodiments of the present disclosure.

FIG. 9 is a block diagram conceptually illustrating a device 710 that may be used with the system. FIG. 10 is a block diagram conceptually illustrating example components of a remote device, such as the natural language command processing system 700, which may assist with ASR processing, NLU processing, etc., and a skill system 725. A system (700/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 710 may operate locally to a user (e.g., within a same environment so the device may receive inputs and playback outputs for the user) the server/system 700 may be located remotely from the device 710 as its operations may not require proximity to the user. The server/system 700 may be located in an entirely different location from the device 710 (for example, as part of a cloud computing system or the like) or may be located in a same environment as the device 710 but physically separated therefrom (for example a home server or similar device that resides in a user's home or business but perhaps in a closet, basement, attic, or the like). One benefit to the server/system 700 being in a user's home/business is that data used to process a command/return a response may be kept within the user's home, thus reducing potential privacy concerns.

Multiple systems (700/725) may be included in the overall system 200 of the present disclosure, such as one or more natural language processing systems 700 for performing ASR processing, one or more natural language processing systems 700 for performing NLU processing, one or more skill systems 725, etc. In operation, each of these systems may include computer-readable and computer-executable instructions that reside on the respective device (700/725), as will be discussed further below.

Each of these devices (710/700/725) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (710/700/725) may also include a data storage component (908/1008) for storing data and controller/processor-executable instructions. Each data storage component (908/1008) may individually include one or more non-volatile storage types such as magnetic storage, optical storage, solid-state storage, etc. Each device (710/700/725) may also be connected to removable or external non-volatile memory and/or storage (such as a removable memory card, memory key drive, networked storage, etc.) through respective input/output device interfaces (902/1002).

Computer instructions for operating each device (710/700/725) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (710/700/725) includes input/output device interfaces (902/1002). A variety of components may be connected through the input/output device interfaces (902/1002), as will be discussed further below. Additionally, each device (710/700/725) may include an address/data bus (924/1024) for conveying data among components of the respective device. Each component within a device (710/700/725) may also be directly connected to other components in addition to (or instead of) being connected to other components across the bus (924/1024).

Referring to FIG. 9, the device 710 may include input/output device interfaces 902 that connect to a variety of components such as an audio output component such as a speaker 912, a wired headset or a wireless headset (not illustrated), or other component capable of outputting audio. The device 710 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 710 may additionally include a display 916 for displaying content. The device 710 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 710, the natural language command processing system 700, or a skill system 725 may include their own dedicated processors, memory, and/or storage. Alternatively, one or more of the components of the device(s) 710, the natural language command processing system 700, or a skill system 725 may utilize the I/O interfaces (902/1002), processor(s) (904/1004), memory (906/1006), and/or storage (908/1008) of the device(s) 710, natural language command processing system 700, or the skill system 725, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 710, the natural language command processing system 700, and a skill system 725, as described herein, are illustrative, and may be located as a stand-alone device or may be included, in whole or in part, as a component of a larger device or system. As can be appreciated, a number of components may exist either on a system 700 and/or on device 710. For example, language processing 792/892 (which may include ASR 750/850), language output 793/893 (which may include NLG 779/879 and TTS 780/880), etc., for example as illustrated in FIGS. 7 and 8. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 11, multiple devices (710a-710j, 700, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 710a, a smart phone 710b, a smart watch 710c, a tablet computer 710d, a vehicle 710e, a speech-controlled device with display 710f, a display/smart television 710g, a washer/dryer 710h, a refrigerator 710i, and a microwave 710j, etc. may be connected to the network(s) 199 through a wireless service provider, over a Wi-Fi or cellular network connection, or the like. Other devices are included as network-connected support devices, such as the natural language command processing system 700, the skill system(s) 725, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the natural language command processing system 700.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving input data to be used to train a machine learning model, the input data representing at least a first sample and a second sample different than the first sample;
   determining that first words represented in the first sample are arranged in accordance with a first natural language phrase pattern;
   determining that second words represented in the second sample are arranged in accordance with to a second natural language phrase pattern, the second natural language phrase pattern being different than the first natural language phrase pattern;
   determining a first training dataset including a first plurality of samples corresponding to the first natural language phrase pattern and a second plurality of samples corresponding to the second natural language phrase pattern;
   determining a first test dataset including a third plurality of samples corresponding to the first natural language phrase pattern and a fourth plurality of samples corresponding to the second natural language phrase pattern;
   determining a first additional dataset including a fifth plurality of samples corresponding to the first natural language phrase pattern, the fifth plurality of samples being different than the first plurality of samples, the first additional dataset to be used to update the first training dataset based on model performance;
   determining a first trained model using the first training dataset, the first trained model configured to perform a prediction task;
   determining, using the first test dataset, that processing by the first trained model with respect to the first natural language phrase pattern is unsatisfactory and that processing by the first trained model with respect to the second natural language phrase pattern is satisfactory;
   based at least in part on the processing by the first trained model with respect to the first natural language phrase pattern being unsatisfactory and the processing by the first trained model with respect to the second natural language phrase pattern being satisfactory, determining a second training dataset including the first plurality of samples, the second plurality of samples, and at least a first additional sample from the first additional dataset; and
   determining a second trained model using the second training dataset, the second trained model configured to perform the prediction task.

2. The computer-implemented method of claim 1, further comprising:
   receiving a prediction accuracy condition associated with the first natural language phrase pattern, the prediction accuracy condition indicative of a minimum prediction accuracy to be satisfied by a trained model with respect to generating predictions for the first natural language phrase pattern; and
   processing the first test dataset using the first trained model to determine first prediction data, the first prediction data including at least a first prediction corresponding to a first sample of the third plurality of samples,
   wherein determining that the processing by the first trained model with respect to the first natural language phrase pattern is unsatisfactory comprises processing the first prediction data with respect to the prediction accuracy condition.

3. The computer-implemented method of claim 1, further comprising:
   receiving a second test dataset including a sixth plurality of samples that the second trained model is previously configured to process;
   determining, using the second test dataset, that processing by the second trained model with respect to the sixth plurality of samples is satisfactory; and
   based at least in part on the processing by the second trained model with respect to the sixth plurality of samples being satisfactory, using the second trained model to perform the prediction task on subsequently received inputs.

4. The computer-implemented method of claim 1, further comprising:
   receiving a second test dataset including a sixth plurality of samples that the second trained model is previously configured to process;
   determining a third natural language phrase pattern of data represented in the second test dataset;
   determining, using the second test dataset, that processing by the second trained model with respect to the third natural language phrase pattern is unsatisfactory;
   based at least in part on the processing by the second trained model with respect to the third natural language phrase pattern being unsatisfactory, determining a third training dataset including the second training dataset and at least one additional sample corresponding to the third natural language phrase pattern; and
   determining a third trained model using the third training dataset, the third trained model configured to perform the prediction task.

5. The computer-implemented method of claim 1, further comprising:
   determining a third training dataset including the first plurality of samples, the second plurality of samples, and a plurality of additional samples from the first additional dataset, wherein the third training dataset includes more samples than the second training dataset;
   determining a third trained model using the third training dataset, the third trained model configured to perform the prediction task;
   determining, using the first test dataset, that processing by the second trained model with respect to the first natural language phrase pattern is satisfactory;
   determining, using the first test dataset, that processing by the third trained model with respect to the first natural language phrase pattern is satisfactory; and
   based at least in part on the second training dataset including fewer samples than the third training dataset, selecting the second trained model, instead of the third trained model, for further processing.

6. The computer-implemented method of claim 1, further comprising:
  receiving a second test dataset including a sixth plurality of samples that the second trained model is previously configured to process;
  determining a third natural language phrase pattern of data represented in the second test dataset;
  determining, using the second test dataset, that processing by the second trained model with respect to the third natural language phrase pattern is unsatisfactory;
  based at least in part on the processing by the second trained model with respect to the third natural language phrase pattern being unsatisfactory, determining a rule to be used to process subsequently received inputs corresponding to the third natural language phrase pattern; and
  using the second trained model and the rule to perform the prediction task on subsequently received inputs.

7. The computer-implemented method of claim 1, further comprising:
  determining a third training dataset including a sixth plurality of samples corresponding to the first natural language phrase pattern and a seventh plurality of samples corresponding to the second natural language phrase pattern, wherein the first training dataset includes fewer samples than the third training dataset;
  determining a third trained model using the third training dataset, the third trained model configured to perform the prediction task;
  determining that the first trained model satisfies a performance metric;
  determining that the third trained model satisfies the performance metric; and
  selecting the first trained model, instead of the third trained model, based at least in part on the first training dataset including fewer samples than the third training dataset, the first trained model being selected for further processing with respect to the first test dataset.

8. The computer-implemented method of claim 1, wherein the input data includes a first natural language input, a second natural language input, and an entity catalog including a plurality of entities, and the method further comprises:
  determining a first portion of the first natural language input representing a first entity;
  determining a first plurality of natural language inputs using the first natural language input and replacing the first portion with individual entities from the entity catalog, wherein the first plurality of natural language inputs includes at least a third natural language input including a second entity from the plurality of entities;
  determining a second portion of the second natural language input representing a third entity;
  determining a second plurality of natural language inputs using the second natural language input and replacing the second portion with individual entities from the entity catalog, wherein the second plurality of natural language inputs includes at least a fourth natural language input including a fourth entity from the plurality of entities;
  determining the first plurality of samples using the first plurality of natural language inputs;
  determining the second plurality of samples using the second plurality of natural language inputs;
  determining the third plurality of samples using the first plurality of natural language inputs; and
  determining the fourth plurality of samples using the second plurality of natural language inputs.

9. A system, comprising:
at least one processor; and
at least one memory including instructions that, when executed by the at least one processor, cause the system to:
  receive input data to be used to train a machine learning model, the input data representing at least a first sample and a second sample different than the first sample;
  determine that first words represented in the first sample are arranged in accordance with to a first natural language phrase pattern;
  determine that second words represented in the second sample are arranged in accordance with to a second natural language phrase pattern, the second natural language phrase pattern being different than the first natural language phrase pattern;
  determine a first training dataset including a first plurality of samples corresponding to the first natural language phrase pattern and a second plurality of samples corresponding to the second natural language phrase pattern;
  determine a first test dataset including a third plurality of samples corresponding to the first natural language phrase pattern and a fourth plurality of samples corresponding to the second natural language phrase pattern;
  determine a first additional dataset including a fifth plurality of samples corresponding to the first natural language phrase pattern, the fifth plurality of samples being different than the first plurality of samples, the first additional dataset to be used to update the first training dataset based on model performance;
  determine a first trained model using the first training dataset, the first trained model configured to perform a prediction task;
  determine, using the first test dataset, that processing by the first trained model with respect to the first natural language phrase pattern is unsatisfactory and that processing by the first trained model with respect to the second natural language phrase pattern is satisfactory;
  based at least in part on the processing by the first trained model with respect to the first natural language phrase pattern being unsatisfactory and the processing by the first trained model with respect to the second natural language phrase pattern being satisfactory, determine a second training dataset including the first plurality of samples and at least a first additional sample from the first additional dataset; and
  determine a second trained model using the second training dataset, the second trained model configured to perform the prediction task.

10. The system of claim 9, wherein the at least one memory includes further instructions that, when executed by the at least one processor, further cause the system to:
  receive a second test dataset including a sixth plurality of samples that the second trained model is previously configured to process;
  determine, using the second test dataset, that processing by the second trained model with respect to the sixth plurality of samples is satisfactory; and
  based at least in part on the processing by the second trained model with respect to the sixth plurality of samples being satisfactory, use the second trained model to perform the prediction task on subsequently received inputs.

11. The system of claim 9, wherein the at least one memory includes further instructions that, when executed by the at least one processor, further cause the system to:
   receive a second test dataset including a sixth plurality of samples that the second trained model is previously configured to process;
   determine a third natural language phrase pattern of data represented in the second test dataset;
   determine, using the second test dataset, that processing by the second trained model with respect to the third natural language phrase pattern is unsatisfactory;
   based at least in part on the processing by the second trained model with respect to the third natural language phrase pattern being unsatisfactory, determine a third training dataset including the second training dataset and at least one additional sample corresponding to the third natural language phrase pattern; and
   determine a third trained model using the third training dataset, the third trained model configured to perform the prediction task.

12. The system of claim 9, wherein the at least one memory includes further instructions that, when executed by the at least one processor, further cause the system to:
   determine a third training dataset including the first plurality of samples, the second plurality of samples, and a plurality of additional samples from the first additional dataset, wherein the third training dataset includes more samples than the second training dataset;
   determine a third trained model using the third training dataset, the third trained model configured to perform the prediction task;
   determine, using the first test dataset, that processing by the second trained model with respect to the first natural language phrase pattern is satisfactory;
   determine, using the first test dataset, that processing by the third trained model with respect to the first natural language phrase pattern is satisfactory; and
   based at least in part on the second training dataset including fewer samples than the third training dataset, select the second trained model, instead of the third trained model, for further processing.

13. The system of claim 9, wherein the at least one memory includes further instructions that, when executed by the at least one processor, further cause the system to:
   receive a second test dataset including a sixth plurality of samples that the second trained model is previously configured to process;
   determine a third natural language phrase pattern of data represented in the second test dataset;
   determine, using the second test dataset, that processing by the second trained model with respect to the third natural language phrase pattern is unsatisfactory;
   based at least in part on the processing by the second trained model with respect to the third natural language phrase pattern being unsatisfactory, determine a rule to be used to process subsequently received inputs corresponding to the third natural language phrase pattern; and
   use the second trained model and the rule to perform the prediction task on subsequently received inputs.

14. The system of claim 9, wherein the at least one memory includes further instructions that, when executed by the at least one processor, further cause the system to:
   determine a third training dataset including a sixth plurality of samples corresponding to the first natural language phrase pattern and a seventh plurality of samples corresponding to the second natural language phrase pattern, wherein the first training dataset includes fewer samples than the third training dataset;
   determine a third trained model using the third training dataset, the third trained model configured to perform the prediction task;
   determine that the first trained model satisfies a performance metric;
   determine that the third trained model satisfies the performance metric; and
   select the first trained model, instead of the third trained model, based at least in part on the first training dataset including fewer samples than the third training dataset, the first trained model being selected for further processing with respect to the first test dataset.

15. The system of claim 9, wherein the input data includes a first natural language input, a second natural language input and an entity catalog including a plurality of entities, and wherein the at least one memory includes further instructions that, when executed by the at least one processor, further cause the system to:
   determine a first portion of the first natural language input representing a first entity;
   determine a first plurality of natural language inputs using the first natural language input and replacing the first portion with individual entities from the entity catalog, wherein the first plurality of natural language inputs includes at least a third natural language input including a second entity from the plurality of entities;
   determine a second portion of the second natural language input representing a third entity;
   determine a second plurality of natural language inputs using the second natural language input and replacing the second portion with individual entities from the entity catalog, wherein the second plurality of natural language inputs includes at least a fourth natural language input including a fourth entity from the plurality of entities;
   determine the first plurality of samples using the first plurality of natural language inputs;
   determine the second plurality of samples using the second plurality of natural language inputs;
   determine the third plurality of samples using the first plurality of natural language inputs; and
   determine the fourth plurality of samples using the second plurality of natural language inputs.

16. The system of claim 9, wherein the at least one memory includes further instructions that, when executed by the at least one processor, further cause the system to:
   receive a prediction accuracy condition associated with the first natural language phrase pattern, the prediction accuracy condition indicative of a minimum prediction accuracy to be satisfied by a trained model with respect to generating predictions for the first natural language phrase pattern;
   process the first test dataset using the first trained model to determine first prediction data, the first prediction data including at least a first prediction corresponding to a first sample of the third plurality of samples; and
   determine that the processing by the first trained model with respect to the first natural language phrase pattern is unsatisfactory at least in part by processing the first prediction data with respect to the prediction accuracy condition.

\* \* \* \* \*